United States Patent [19]
Tanahashi et al.

[11] Patent Number: 6,113,755
[45] Date of Patent: *Sep. 5, 2000

[54] APPARATUS FOR PRODUCING AN ELECTRODE FOIL FOR USE IN ALUMINUM ELECTROLYTIC CAPACITORS

[75] Inventors: Masakazu Tanahashi; Kounosuke Hashio; Mitsuhisa Yoshimura; Daisuke Suzuki, all of Osaka; Masanori Okabayashi; Shinji Kabeya, both of Kyoto, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,722

[22] Filed: Dec. 5, 1996

Related U.S. Application Data

[62] Division of application No. 08/647,695, May 15, 1996.

[30] Foreign Application Priority Data

May 18, 1995 [JP] Japan ................................... 7-120188

[51] Int. Cl.⁷ .............................. C25D 7/06; C25D 17/10
[52] U.S. Cl. .................... 204/211; 204/206; 204/DIG. 7
[58] Field of Search ..................... 205/96, 139; 204/206, 204/211, DIG. 7

[56] References Cited

U.S. PATENT DOCUMENTS

| | | | |
|---|---|---|---|
| 2,538,317 | 11/1951 | Mason et al. | 204/28 |
| 3,079,308 | 2/1963 | Ramirez et al. | 204/28 |
| 3,471,389 | 10/1969 | Swanson | 204/181 |
| 3,865,700 | 2/1975 | Fromson | 204/28 |
| 3,969,211 | 7/1976 | Watanabe | 204/211 |
| 4,077,864 | 3/1978 | Vanderveer et al. | 204/285 |
| 4,323,433 | 4/1982 | Loch | 204/56 R |
| 5,120,404 | 6/1992 | Okabayashi et al. | 205/139 |

FOREIGN PATENT DOCUMENTS 58-171597  10/1983  Japan ................................... 205/139

*Primary Examiner*—Kathryn Gorgos
*Assistant Examiner*—William T. Leader
*Attorney, Agent, or Firm*—Merchant & Gould P.C.

[57] ABSTRACT

This invention provides an apparatus for producing an electrode foil for use in aluminum electrolytic capacitors with which a high capacitance is obtained while the distortion of the foil and the leakage current can be controlled. At least two electrode plates as cathode are disposed in an electrolytic tank containing an electrolytic solution, and a direct current is supplied between an aluminum foil as anode and the electrode plates. Anodization is conducted continuously by turning the direction of the aluminum foil via rollers and conveying the foil between the electrode plates. During this treatment, the length and the position of the effective sections of the electrode plates are adjusted to keep the length to be at most two-thirds of the distance between an area near the surface of the electrolytic solution and the upper part of the bottom roller, so that the peak value of the anodizing current density appears not at the surface of the electrolytic solution but in the electrolytic solution.

26 Claims, 21 Drawing Sheets

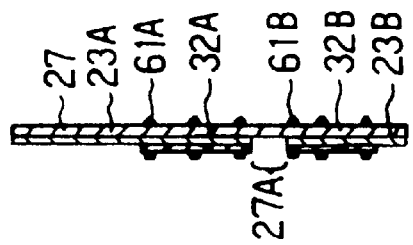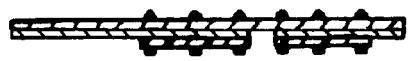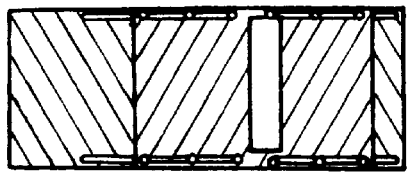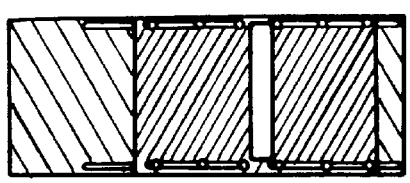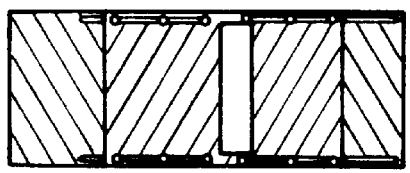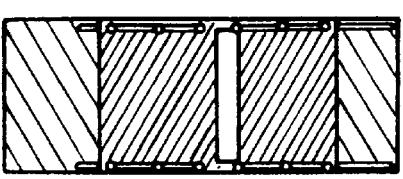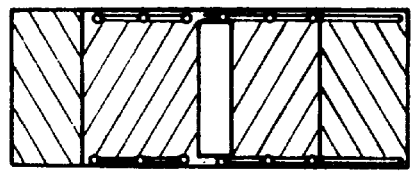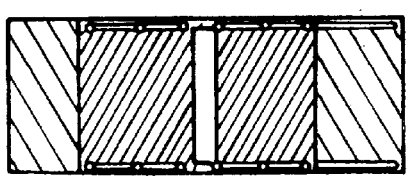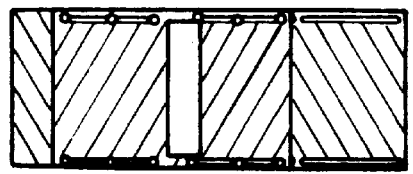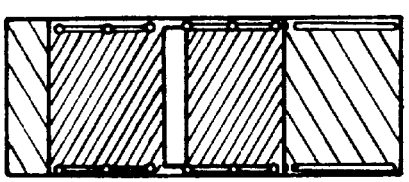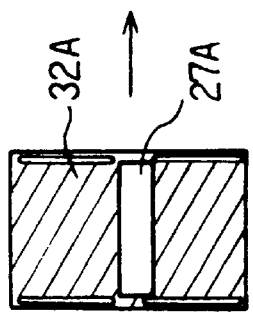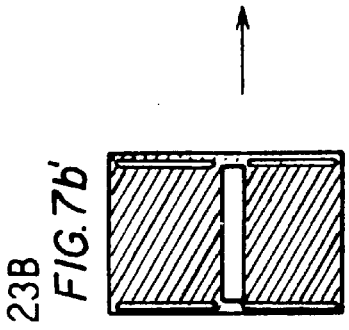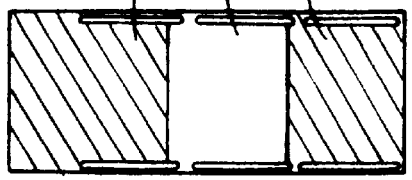

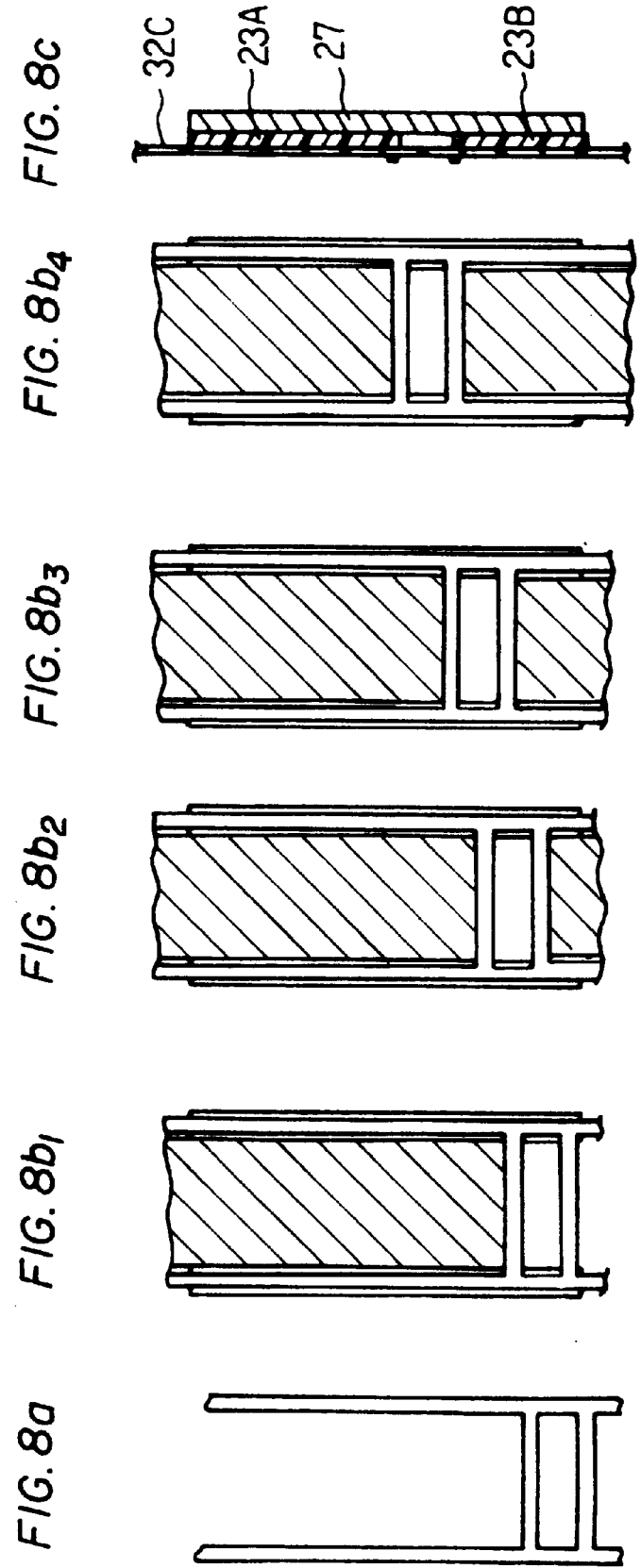

| | | |
|---|---|---|
| A | 20mS/cm | (90°C) |
| B | 30mS/cm | (90°C) |
| C | 100mS/cm | (90°C) |
| D | 200mS/cm | (90°C) |
| E | 500mS/cm | (90°C) |

APPARATUS FOR PRODUCING AN ELECTRODE FOIL FOR USE IN ALUMINUM ELECTROLYTIC CAPACITORS

This is a Divisional of application Ser. No. 08/647,695, filed May 15, 1996, pending.

FIELD OF THE INVENTION

This invention relates to an apparatus and a method of producing an electrode foil for use in aluminum electrolytic capacitors.

BACKGROUND OF THE INVENTION

Anode etching of aluminum foils with high-purity in an electrolytic solution containing chloride ions ($Cl^-$) in order to form pits and to increase its surface area (A) has been used to prepare foils for use in aluminum electrolytic capacitors. After the treatment, anodization is conducted in the electrolytic solution to form a dielectric forming film (the thickness is t and the dielectric constant is $\epsilon$). The value of the capacitance (C) of the electrode foil is obtained by the formula, $$C = \epsilon (A/t)$$

In order to increase the capacitance (C), the surface area should be increased and the dielectric forming film should be thinner. Various methods of producing dielectric foils have been examined. U.S. Pat. No. 5,120,404 discloses a method of anodization of aluminum foils at a low voltage of 150 V at most, in which the aluminum foils electrolytically-etched using a pulse current are anodized in an aqueous solution of ammonium adipate. As for medium or high voltage usage, aluminum foils which are electrolytically etched using a direct current are provided with a hydroxide film and treated to decrease the conductivity to be smaller than that for a low voltage usage, using phosphoric acid or boric acid electrolytic solution. The method of anodization is substantially the same as for the low voltage method.

FIG. 19 is a schematic view showing one such method. In the anodizing tank in FIG. 19, numeral 1 is a feeding roller to supply aluminum foil and also to supply a direct current. Numeral 2 is a direct current (DC) power source, 3 is an anodizing tank to anodize the aluminum foil, 4 is an electrode plate to supply current into the solution, 5 is an aluminum foil as a substrate, 6 is an electrolytic solution, 7 is a bottom roller to transport the aluminum foil, 8 is an anodized aluminum foil and 9 is a transporting roller to transport the anodized aluminum foil outside the tank. The anode of the DC power source 2 is connected to the feeding roller 1 made of metals like copper (Cu) or silver (Ag), while the cathode of the power source 2 is connected to the electrode plates 4 in the anodizing tank 3. The aluminum foil 5 is anodized by continuously traveling on the feeding roller 1 while passing between the two electrode plates 4 in the electrolytic solution 6 inside the tank 3. And the foil is reversed by the bottom roller 7 at the bottom of the anodizing tank 3, again travels between the two electrode plates 4 and goes out from the solution surface, then travels while contacting with the transporting roller 9.

Next, a method of feeding by a general charging tank is explained referring to FIG. 20. FIG. 20 shows the structure of a feeding tank. In this drawing, 10 is a direct current power source to supply a direct current. 11 is a feeding tank to supply a current to the aluminum foil 13. 12 are electrode plates dipped in the feeding solution 14. 15 is a bottom roller, and 16 is a transporting roller. The anode of the DC power source 10 is connected to the electrode plates 12 disposed in the feeding tank 11, and the cathode of the power source 10 is connected to the electrode plates 4 (Z) in the anodizing tank 3 (cf. FIG. 19). The current from the direct current power source 10 is provided to the aluminum foil 13 through the electrode plates 12 and through feeding solution 14.

However, according to the conventional method, oxide coating films are not formed on the aluminum foil 5 when the non-anodized aluminum foil 5 travels continuously and enters between the two electrode plates 4 in the anodizing tank 3. Therefore, a large rush current on the order of from $10^2 mA/cm^2$ to $10^3 mA/cm^2$ flows as a current density at the area A of FIG. 19. The value depends on the conductivity of the electrolytic solution and also the distance between the electrode plate and the Al film. Then, the current density decreases as the oxide coating film grows. In this case, when the large rush current flows, the surface of the aluminum foil having fine irregularities melts and thus the increased surface area from the etching decreases. When the large rush current flows, Joule's heat is generated and the temperatures of the aluminum foil 5 and the electrolytic solution 6 are raised. This results in a quantity of aluminum ions eluting from the surface of the aluminum foil 5, and the ions become hydroxides on the surface of the aluminum foil 5. If this aluminum hydroxide is taken into the oxide coating film of the aluminum foil 5 or adheres to the foil, the oxide coating film becomes thicker or the etch pits are sealed. Because of these factors including the above-mentioned surface-melting, sufficient capacitance cannot be obtained and the oxide coating film may be distorted. As a result, leakage current increases as time passes. Similar to the case of the anodizing tank 3, current concentrates in the area D shown in FIG. 20 in the feeding tank 1, and hydrogen gas is generated from the aluminum foil 13. As a result, the aluminum foil 13 is deformed.

SUMMARY OF THE INVENTION

This invention aims to provide an apparatus and method for producing an electrode foil for use in an aluminum electrolytic capacitor to solve the problems of the conventional technique and provide an electrode foil that enjoys high capacitance while controlling leakage current.

In order to achieve such aims, an apparatus for producing an electrode foil for use in aluminum electrolytic capacitors of this invention conducts a continuous anodization using an aluminum foil (anode) and electrode plates (cathode) in an electrolytic tank containing an electrolytic solution. The apparatus of this invention also has a means to adjust the peak value of the anodizing current density so that the peak appears in the solution, not at the surface of the solution.

According to the method of producing an electrode foil for use in aluminum electrolytic capacitors of this invention, an aluminum foil is continuously anodized by supplying a direct current between the aluminum foil (anode) and electrode plates (cathode) in an electrolytic tank containing an electrolytic solution. And according to this method, the peak value of the anodizing current density appears not at the surface of the solution but in the solution during the anodization process.

It is preferable in the apparatus and the method that the peak value of the anodizing current density is kept in the electrolytic solution by means of coating at least one portion of the electrode with an insulator, and the coated portion is located near the surface of the solution. In this manner, the peak value is effectively kept in the electrolytic solution.

It is preferable in the apparatus and the method that the means to keep the peak value in the solution are produced by dipping portions of the electrode plates in an insulator, so that windows are formed on the surfaces of the electrodes to face the aluminum foil, and the peak value of the anodizing current density effectively appears in the electrolytic solution, not at the surface of the solution.

It is preferable that the means to keep the peak value of the anodizing current density in the electrolytic solution is baffle plates of insulator disposed between the electrode plate and the aluminum foil, so that the peak value of the anodizing current density is effectively kept in the solution.

It is preferable that the windows are variable in dimension and/or position, so that the windows can be controlled according to the desired anodizing condition.

It is preferable that the cathode in the electrolytic tank comprises at least two electrode plates, the means to transport the aluminum foil comprises plural rollers, and the aluminum foil turns inside the electrolytic tank and travels between the electrode plates to conduct continuous anodization. Accordingly, mass-production is possible.

It is preferable that the means to turn the aluminum foil in the electrolytic tank is a resin roller, so that the direction of the aluminum foil can be changed while keeping its insulation.

It is preferable that the height of the window is at most two-thirds of the dimension from the solution surface to the upper part of the bottom roller, so that the peak value of the anodizing current density effectively appears in the electrolytic solution.

It is preferable that the insulator is at least one insulator selected from the group consisting of synthetic resin, fiber-reinforced synthetic resin, and synthetic rubber, so that the insulating property is excellent.

It is preferable that the conductivity E of the electrolytic solution is in the range of $1\times10^{-3}$ S/cm$<$E$<$0.5S/cm (90° C.), so that effective mass production is possible.

It is preferable that an aluminum electrode foil suitable for use in aluminum electrolytic capacitors is prepared by the method described above, and that an aluminum electrolytic capacitor comprises the aluminum foil.

According to this invention, an apparatus for producing an electrode foil for use in aluminum electrolytic capacitors continuously charges the aluminum foil with electric power by (i) disposing at least two electrode plates as anode in a feeding tank containing a feeding solution, (ii) disposing at least two electrode plate as cathode in an anodizing tank containing an anodizing solution, (iii) supplying a direct current between the anode electrode plates and the cathode electrode plates, and (iv) turning the aluminum foil by plural rollers and converging the foil between the electrode plates from the feeding tank to the anodizing tank. The apparatus of this invention also has a means to keep the peak current density in the feeding solution, but not at the surface of the feeding solution.

According to this invention, the method of producing an electrode foil for use in aluminum electrolyc capacitors consists of the following steps, (i) disposing at least two electrode plates as anode in a feeding tank containing a feeding solution, (ii) disposing at least two electrode plate as cathode in an anodizing tank containing an anodizing solution, (iii) supplying a direct current between the anode electrode plates and the cathode electrode plates, and (iv) turning the aluminum foil by plural rollers and conveying the foil between the electrode plates from the feeding tank to the anodizing tank, and during the steps, the peak value of the feeding current density appears in the feeding solution, not at the surface of the feeding solution.

It is preferable that at least one portion of the electrodes is coated with an insulator, and the coated portion is located near the surface of the feeding solution, so that the peak value of the feeding current density appears in the feeding solution.

It is preferable that the means to keep the peak value of the feeding current density in the feeding solution is a means to cover at least the surface of the solution, using an insulating material, and a window is formed on the surface facing the aluminum foil.

It is preferable that the means to keep the peak value of the feeding current density is the baffle plates of an insulator between the electrode plate and the aluminum foil.

It is preferable that the window is variable in dimension and/or position so that the window can be controlled according to the desired anodizing condition.

It is preferable that the cathode in the electrolytic tank comprises at least two electrode plates, the means to transport the aluminum foil comprises plural rollers, and the aluminum foil turns inside the electrolytic tank and travels between the electrode plates for continuous anodization.

It is preferable that the means to turn the aluminum foil in the electrolytic tank is a resin roller.

It is preferable that the height of the window is at most two-thirds of the dimension from the solution surface to the upper part of the bottom roller.

It is preferable that the insulator is at least one material selected from the group consisting of synthetic resin, fiber-reinforced synthetic resin, and synthetic rubber.

It is preferable that the conductivity E of the electrolytic solution is in the range of $1\times10^{-3}$ S/cm$<$E$<$0.5S/cm (90° C.).

It is preferable that an aluminum electrode foil suitable for use in aluminum electrolytic capacitors is prepared by the method described above, and that an aluminum electrolytic capacitor comprises the aluminum foil.

BRIEF DESCRIPTION OF THE DRAWINGS

FIGS. 7(a)–(d') show electrode plates of one embodiment of this invention in which the length and the position of the effective section are variable.

FIGS. 8(a)–(c) show the electrode plates in which the length and the position of the effective sections of the electrodes are variable.

In FIG. 12, the effective sections of the electrode plates are 25 mm long, the effective sections are positioned 375 mm below the solution surface, and the baffle plates are 50 mm long. Effective sections are provided near the surface of the area B.

DETAILED DESCRIPTION OF THE INVENTION

This invention provides the above-mentioned apparatus for producing an electrode foil for use in an aluminum electrolytic capacitor, in which an aluminum foil is continuously anodized by supplying a direct current between the aluminum foil (anode) and electrode plates (cathode). And according to this invention, a high capacitance is obtained and an electrode foil having reduced leakage current can be produced. For example, the apparatus has electrode plates, and the length and the position of the effective section of the electrode plate are variable so that the peak value of the anodizing current density appears in the electrolytic solution, not at the surface of the solution. Here, the length of the effective section is the longitudinal dimension of the exposed portion of the electrode plate, and the position of the effective section is the dipping depth of the same portion. A continuous anodization is conducted using the electrode plate in the following steps: (i) disposing at least two electrode plates (cathode) in an electrolytic tank containing an electrolytic solution, (ii) supplying a direct current between the aluminum foil (anode) and the electrode plates, (iii) turning the aluminum foil by plural rollers and conveying the foil between the electrode plates. The effective section is a portion which functions as an electrode plate. In other words, the other portion coated with an insulator is not included in the effective section.

Figure 21:
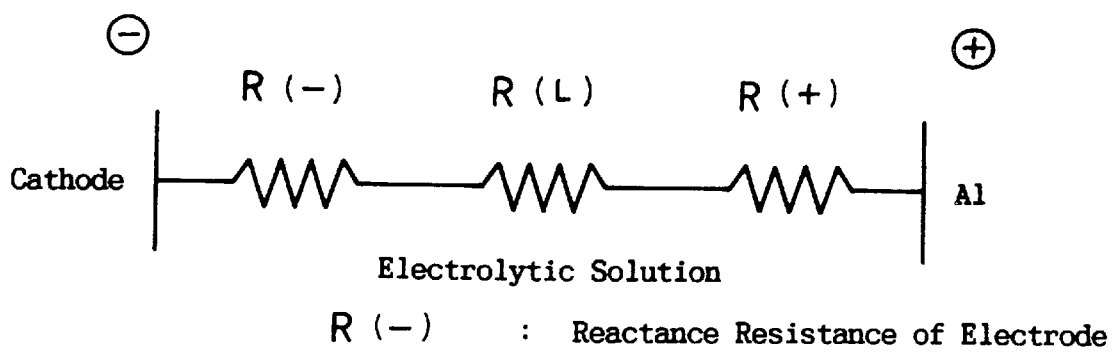
FIG. 21 is a schematic view showing the operation of one embodiment of this invention.

When conducting anodization, a constant current or a constant voltage is applied between an aluminum foil (anode) and electrode plates (cathode) via an electrolytic solution. When the Al foil travels continuously, the voltage may be kept nearly constant even if the current is constant. On the other hand, an oxide film formed on the Al etching foil by anodization becomes thicker as the anodization proceeds, and thus the reactance resistance of the anodizing rises. Therefore, a large quantity of current flows when the film is still thin at the first stage of anodization, and the current decreases as the anodizing proceeds (FIG. 21). In FIG. 21, the anodizing current should be controlled while the voltage between the anode and the cathode is constant and the reactance resistance on the Al foil varies. For this purpose, it is necessary to use the cathode reactance resistance or to control the resistance in the electrolytic solution. Namely, R(+) increases according to the anodizing process while R(−) is constant. Therefore, if R(L) is kept constant, the anodizing current is large at the beginning since R(+) is not increased. As anodizing proceeds, R(+) increases while the current is decreased. R(−) is nearly kept constant, and R(+) varies with the anodizing process. When the solution resistance of the electrolytic solution R(L) is set to keep the total of R(+) and R(−) constant, the obtainable current density is nearly constant. If R(L) is variable, the best current can be obtained.

According to the above-mentioned production method, the length and the position of the effective sections of the cathode electrode plates are predetermined so that the peak value of the anodizing current density appears not at the surface of the electrolytic solution but in the solution when a continuous anodizing of an aluminum foil is conducted by supplying a direct current between an aluminum foil (anode) and electrode plates (cathode). Accordingly, a large rush current does not flow, so the fine irregular surface of the aluminum foil is hardly melted, and aluminum hydroxide is hardly formed. Therefore, a high capacitance is obtained and an electrode foil for aluminum electrolytic capacitors with a reduced leak current is obtained.

Figure 1:
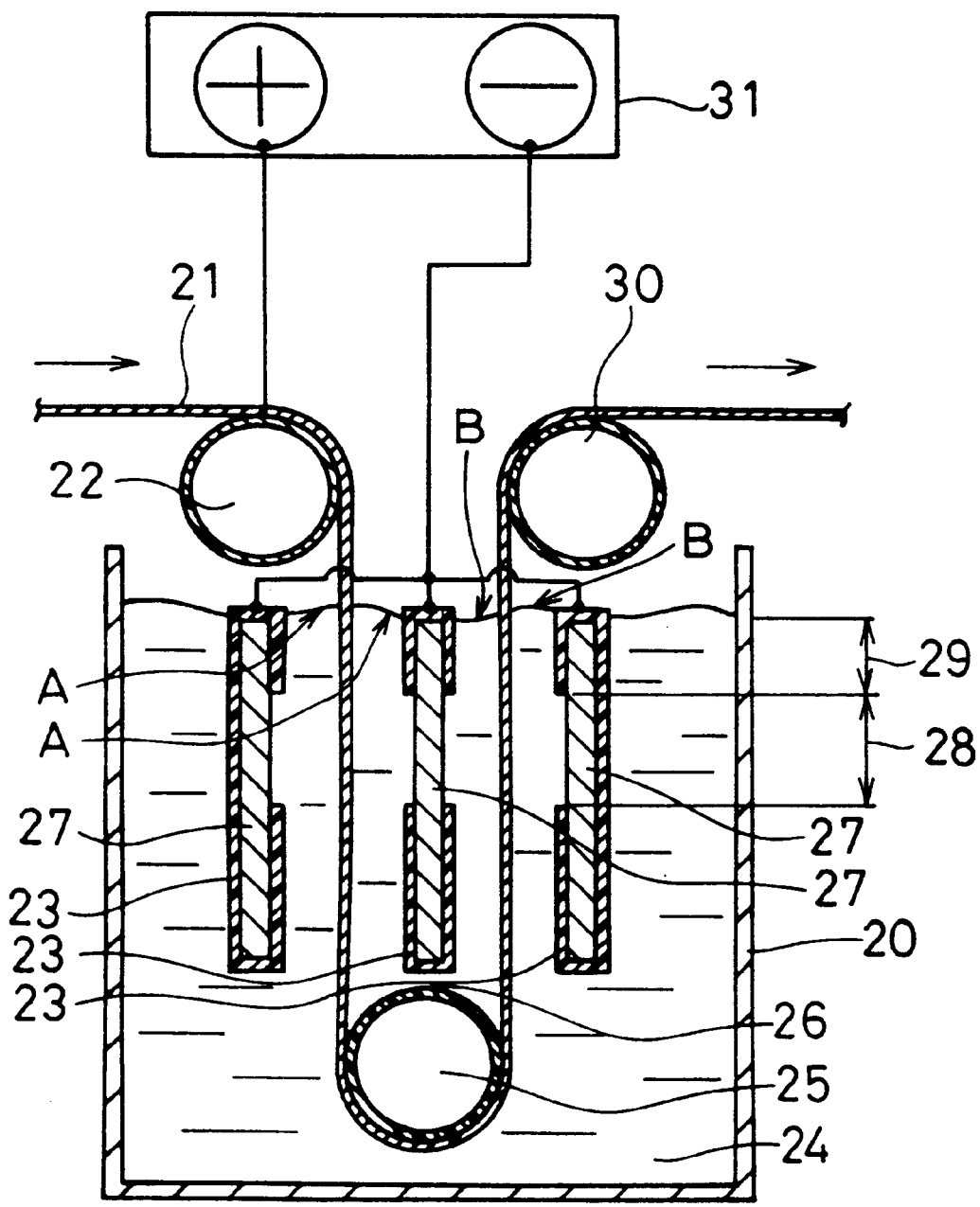
FIG. 1 is a schematic view showing an anodizing tank used in producing an electrode foil for use in aluminum electrolytic capacitors in an embodiment of this invention.

The embodiments of this invention are explained with respect to the drawings. FIG. 1 is a schematic view showing the structure of an anodizing tank. Numeral 20 is the anodizing tank containing an electrolytic solution 24. 21 is an aluminum foil to be anodized and 22 is a feeding roller to carry the aluminum foil and also supply a direct current. 23 are electrode plates. 25 is a bottom roller and 26 is the upper portion of the bottom roller 25. 27 are the effective sections of the electrode plates and 28 indicates the length of the effective sections of the electrode plates (the longitudinal dimension of the exposed portions of the electrode plates). 29 is the position of the effective sections of the electrode plates (the dipping depth of the exposed portions of the electrode plates). 30 is a transporting roller, and 31 a direct current (DC) power source. The dimension of the exposed portion is preferably ranging from 20 to 80% of the whole area of the electrode plate. And the dipping depth of the exposed portion of the electrode plate is preferably at least 10 cm from the solution surface, or more preferably, at least 20 cm. It is especially preferable that the depth is ranging from 50 to 60 cm or more.

The anode of the DC power source 31 is connected to the feeding roller 22 made of metals like Cu or Ag, and the cathode of the DC power source 31 is connected to the electrode plates 23 in the anodizing tank 20. The aluminum foil 21 is anodized while it continuously moves in contact with the feeding roller 22, passing between the two electrode plates 23 disposed in the electrolytic solution 24 in the anodizing tank 20, is reversed by the bottom roller 25 at the bottom of the anodizing tank 20 and again passes between the electrode plates 23 to go out of the solution. Then, the aluminum foil is in contact with the transporting roller 30.

Figure 2:
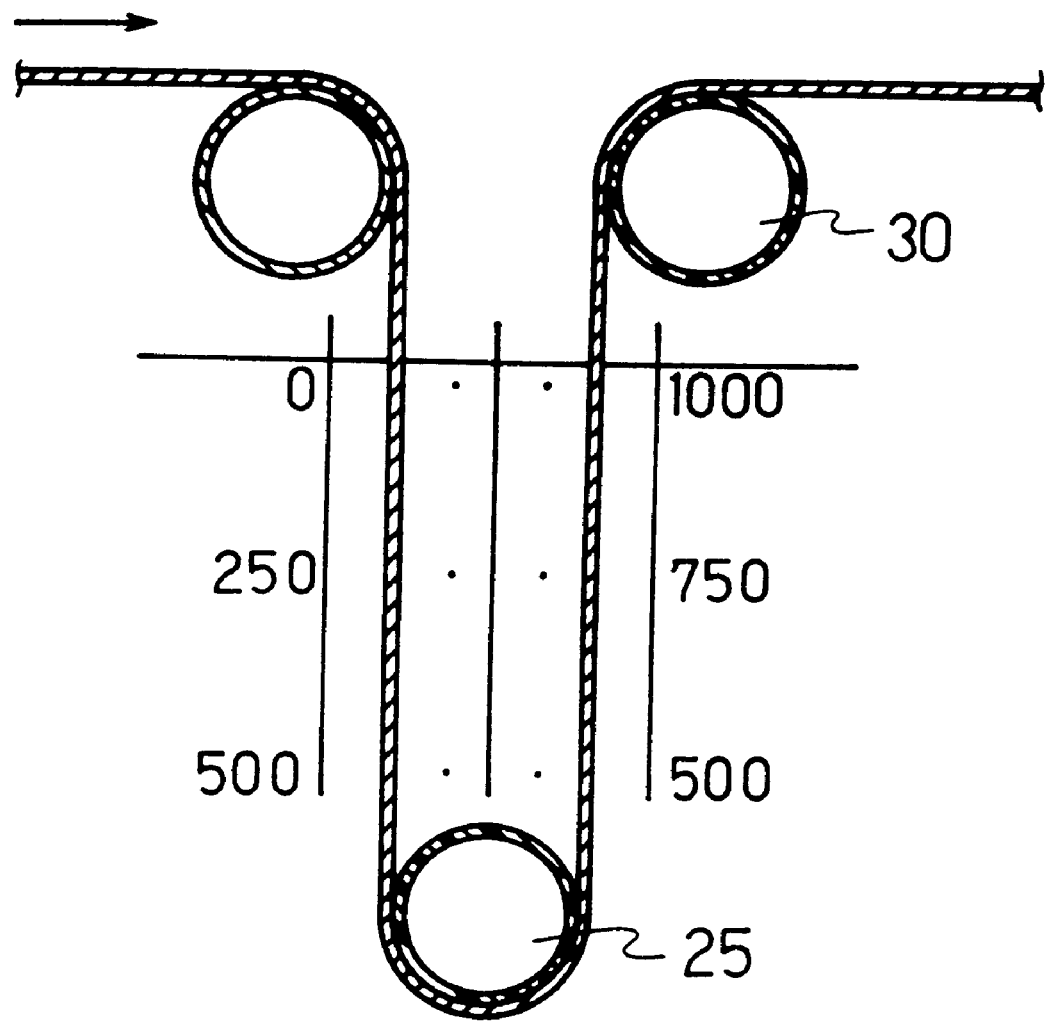
FIG. 2 is a schematic view showing the positions to measure the current density of the aluminum foil in the anodizing tank of FIG. 1.

The position of the aluminum foil 21 in the anodizing tank is shown in FIG. 2. The aluminum foil 21 continuously moves in contact with the feeding roller 22, and is dipped in the electrolytic solution 24 in the anodizing tank 20, where it is indicated as a distance 0 mm from the solution surface. The distance between the surface and the upper portion of the bottom roller 25 is 500 mm. The foil is reversed at the bottom roller 25 in which the flowing current is negligible, and again passes through the two electrode plates 23 (500 mm from the surface). The foil goes out from the solution at a position 1000 mm from the starting point. As mentioned above, the distance from the solution surface and the current density were measured. Anodization was conducted using the following parts:

(1) foil: etching foil
(2) foil transporting velocity: 50 cm/min
(3) feeding: roller feeding
(4) pitch: one
(5) length of electrode: 500 mm (stainless steel SUS301)
(6) electrolytic solution: aqueous solution of ammonium adipate
(7) conductivity of electrolytic solution: $50 \times 10^{-2}$ S/cm (at 45° C.)
(8) temperature of electrolytic solution: 45° C.
(9) width of aluminum foil: 50 mm
(10) thickness of aluminum foil: 100 µm
(11) size of electrolytic tank: 100 mm long, 500 mm wide, 700 mm deep (capacity of 35 liters)

The details are explained below.

The First Embodiment

Figure 3:
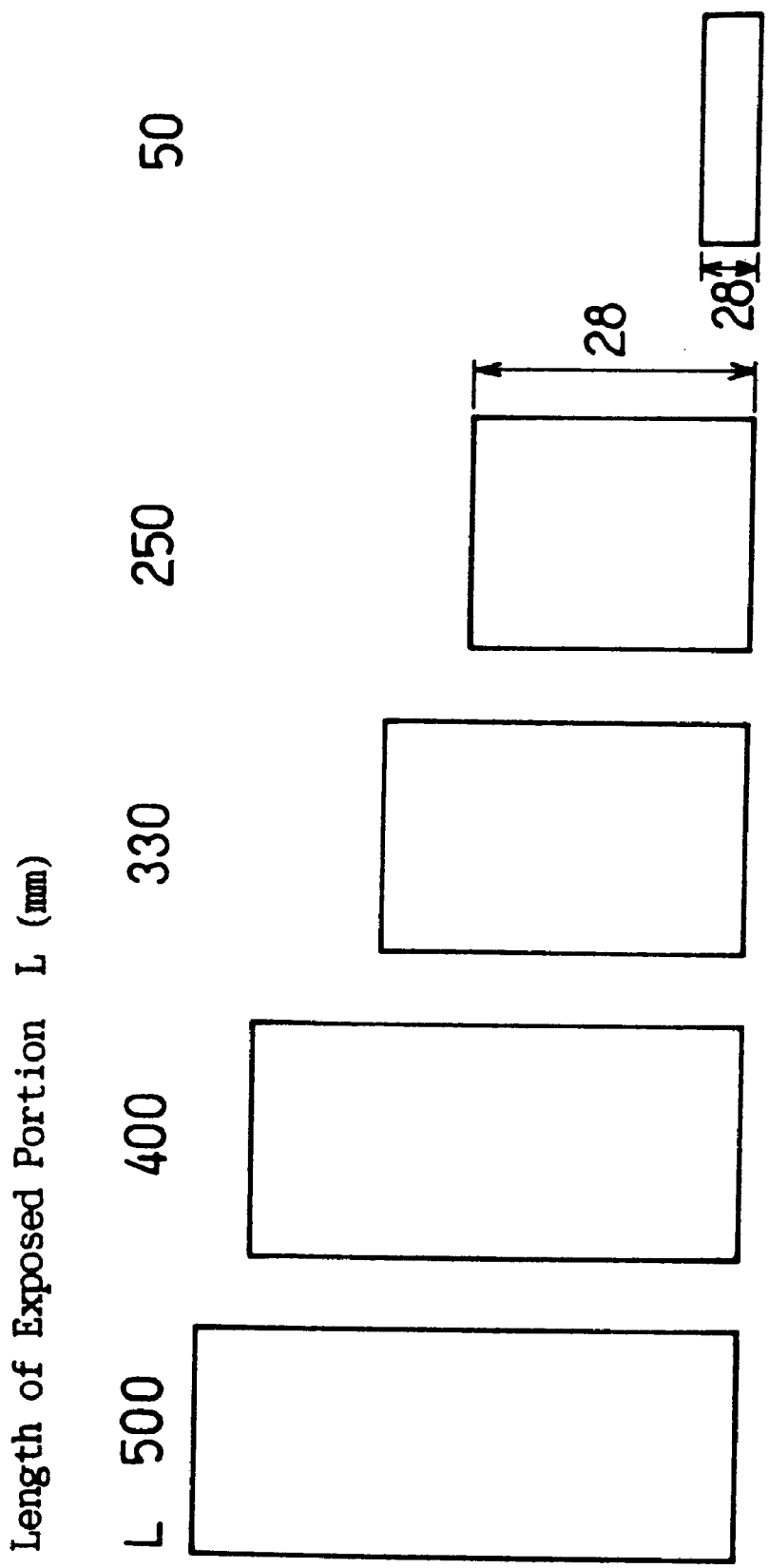
FIG. 3 is a schematic view showing electrode plates which have effective sections 500 mm long, 400 mm long, 330 mm long 250 mm long and 50 mm long respectively.
Figure 4:
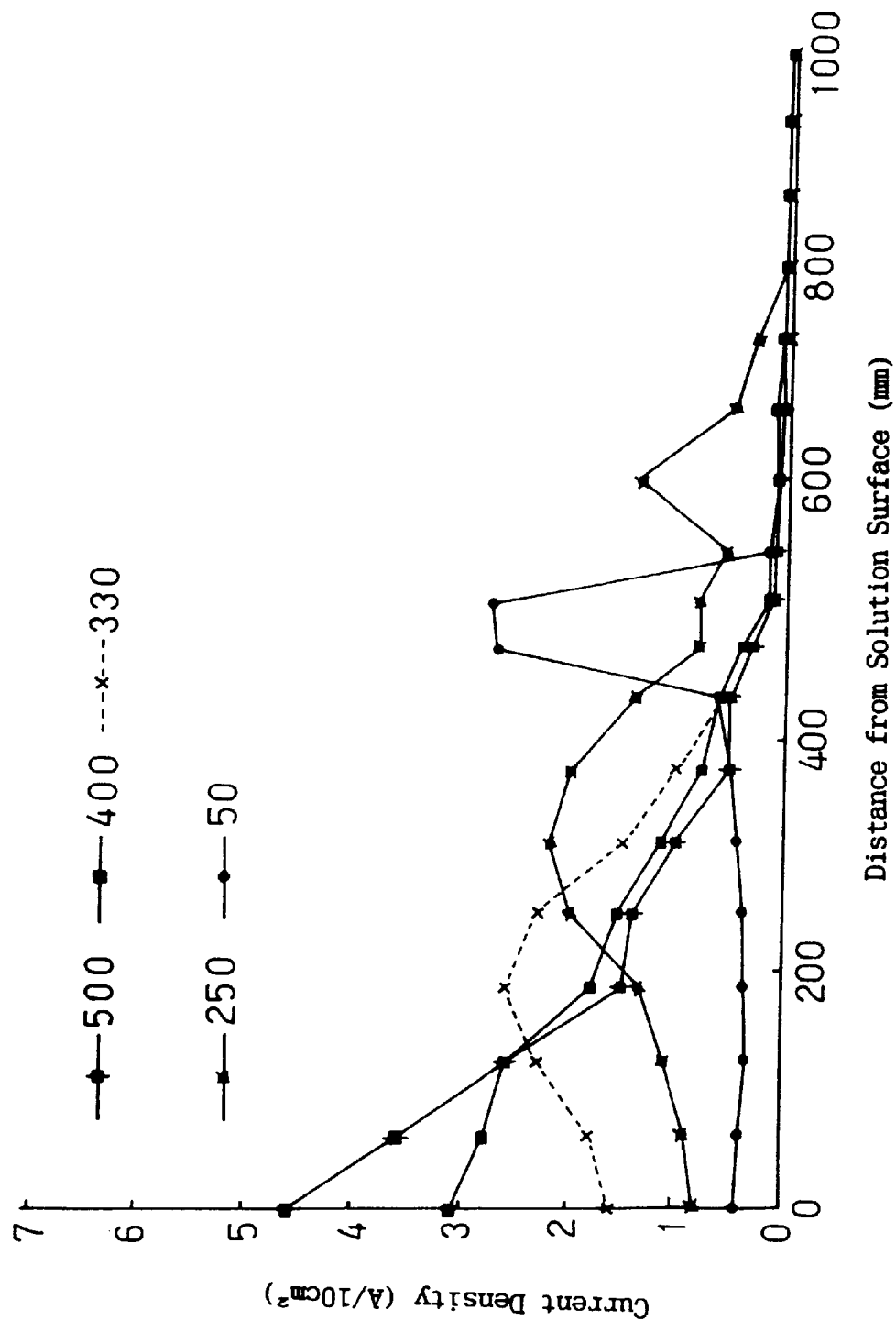
FIG. 4 is a graph showing the current density when anodizing was conducted using the electrode plates of FIG. 3.
Figure 5:
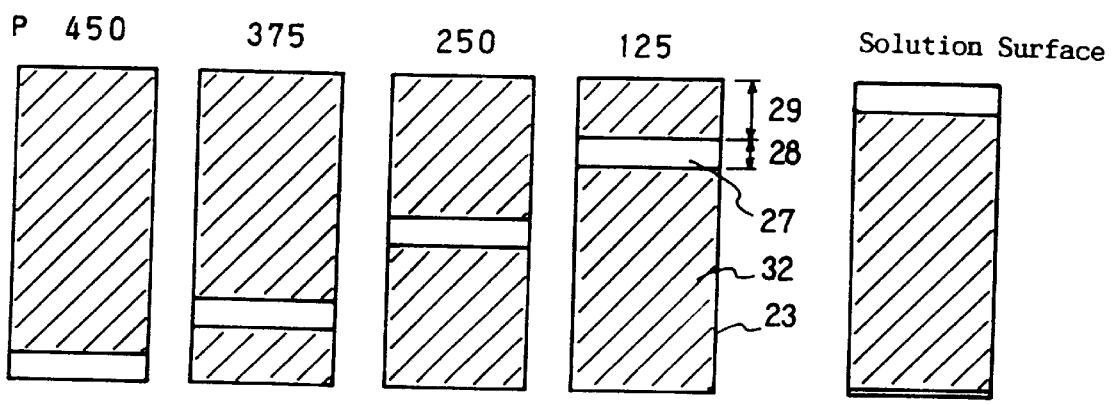
FIG. 5 is a schematic view showing electrode plates of one embodiment of this invention. The length of the effective section of every electrode plate is 50 mm, and the positions of the effective sections are respectively 0 mm, 125 mm, 250 mm, 375 mm, and 450 mm below the electrolytic solution surface.
Figure 6:
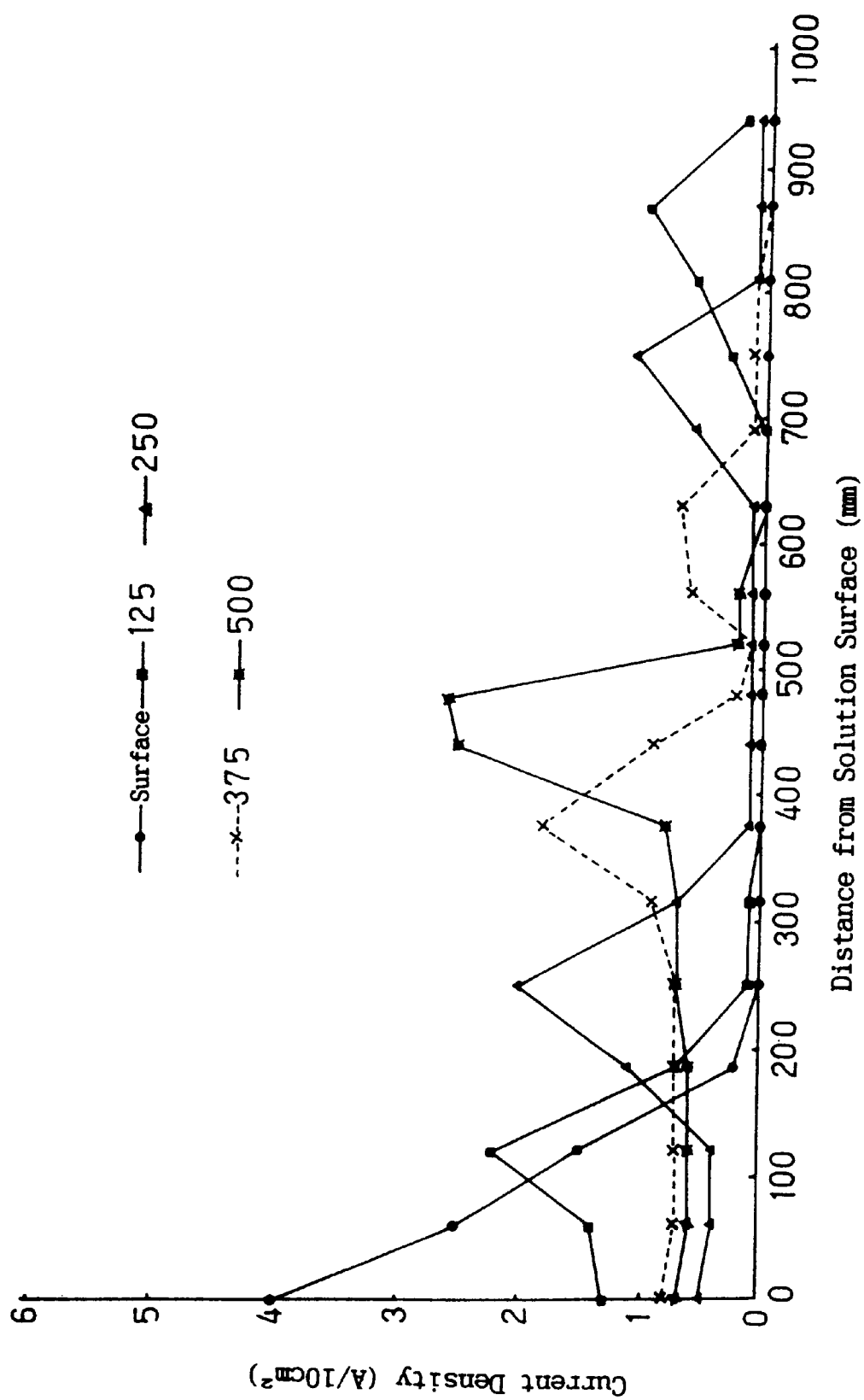
FIG. 6 is a graph showing the current density when anodizing was conducted using the electrode plates of FIG. 5.

FIG. 4 is a graph showing the relationship between the current density and the distance from the solution surface, where anodization was conducted in the above described condition. In this embodiment, the applied voltage was 40 V, the length 28 of the effective sections of the electrode plates was shortened to be 500 mm, 400 mm, 330 mm, 250 mm, and 50 mm (FIG. 3) so that the effective section 27 was separated from the solution surface and the current concentration on the solution surface was relieved. When the length is two-thirds of the peak length of the effective sections of the electrode plates (332 mm or less), the peak value of the anodizing current density appeared not at the surface of the solution but in the solution, thus the current concentration on the solution surface was relieved. In other words, the peak of the current density shifted from the electrolytic solution surface to the effective sections of the electrode plates when the effective sections are shortened. When the conductivity of the electrolytic solution is varied from $1 \times 10^{-3}$ S/cm to 0.5S/cm (90° C.), the peak value of the anodizing current density varies. However, the position of the current density peak was substantially the same. Next, insulating coating 32 or insulating sheet 32 was applied to the 500 mm length of the electrode plates 23. Fluoro resins like polytetrafluoroethylene (PTFE) or synthetic rubbers like a silicone rubber and a fluoro rubber can be used as such insulating coating or an insulating sheet. In this embodiment, a fluoro rubber of 0.2 mm thickness was used. The length of the effective sections of the electrode plates 28 was 50 mm. And anodization was conducted so that the predetermined position 29 of the effective sections was 0 mm, 125 mm, 250 mm, 375 mm, and 450 mm from the solution surface (FIG. 5). FIG. 6 is a graph showing the relationship between the current density and the distance from the solution surface. When the position 29 is separated from the solution surface, the peak value of the anodizing current density is shifted from the solution surface to the effective sections 27 of the electrode plates, and the peak value of the anodizing current density was decreased. In this manner, the peak value of the current density is shifted by adjusting the length 28 and the position 29 of the effective sections of the electrode plates, and the current concentration at the solution surface is relieved. As a result, a continuous anodizing at the best current density is enabled.

In addition, the length and the position of the effective sections of the electrode plates becomes variable by combining the variations of the length of the exposed portion (FIG. 3) and of the position of the exposed portion (FIG. 5) and also the insulating sheets. For example, FIGS. 7(a)–(d), and 7(a')–(d') respectively show partially-coated electrode plates and insulating sheets. In FIGS. 7, the length of the effective sections of the electrode plates is 50 mm (FIGS. 7b, $c_1$–$c_4$, d), or 30 mm (FIGS. 7b', $c_1'$–$c_4'$, d'). The depth from the solution surface is varied from 200 mm (FIGS. $7c_1$, $c_1'$) to 250 mm (FIGS. $7c_2$, $c_2'$) to 300 mm (FIGS. $7c_3$, $c_3'$) to 350 mm (FIGS. $7c_4$, $c_4'$). FIG. 7d is a cross-sectional view of FIG. $7c_4$, and FIG. 7d' is a cross-sectional view of FIG. $7c_4'$. In FIGS. 7, 23A is an upper insulating sheet, 23B is a lower insulating sheet, 32A is another insulating sheet to be attached on the upper insulating sheet and 32B is an insulating sheet attached on the lower insulating sheet. 61A and 61B are a bolt and a nut, and 27A is the exposed portion of the electrode plate.

If there are some other insulating sheets having varied length (10 mm, 20 mm . . . ), the effective section of the electrode plate can be adjusted according to the current density and the foil characteristic, without exchanging the electrode plates.

FIGS. 8(a)–(c) are schematic views showing other examples of the variable length and the positions of the effective sections. In these drawings, glass fiber-reinforcing polyester resins 23A and 23B are provided between the frame body 32C and the electrode plate 27. In FIGS. 8($b_1$–$b_4$), the length of the effective section is either 50 mm or 30 mm. In FIG. 8($b_1$), the position of the effective section is 450 mm. In FIG. 8($b_2$), the position is 350 mm. In FIG. 8($b_3$), the position is 300 mm. In FIG. 8($b_4$), the position is 400 mm.

As mentioned above, if the electrode plates having a length of effective sections are provided at preferable positions, their positions can be adjusted according to the current density and the foil characteristic. If several kinds of electrode plates with varying length of effective sections are provided, the length of the effective section can be adjusted freely according to the voltage, the current density and the foil charactreristic. Furthermore, the combination of the structures shown in FIG. 7 and FIG. 8 enables fine tuning of the length and the position.

The Second Embodiment

Figure 9:
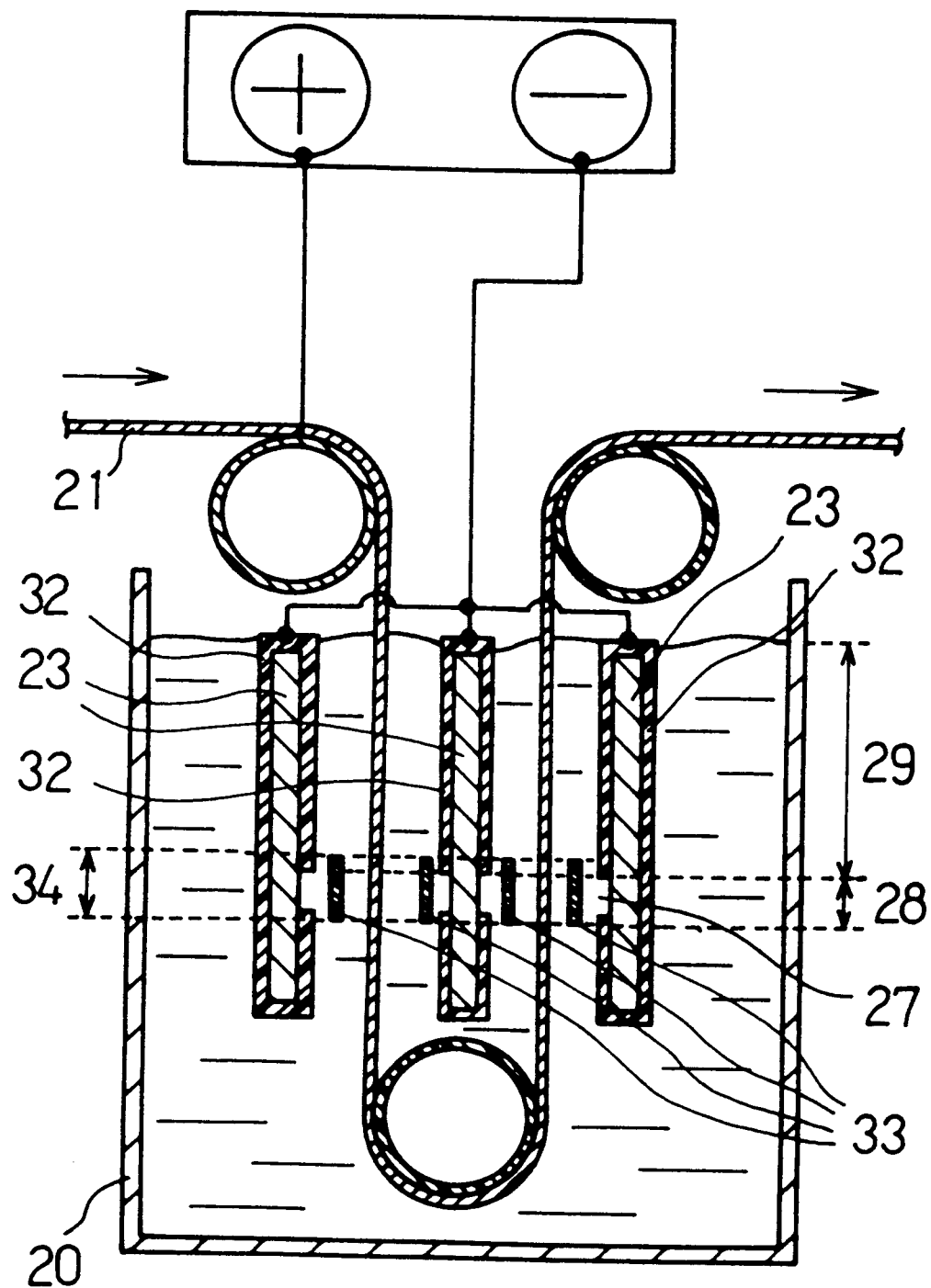
FIG. 9 is a schematic view showing the anodizing tank, in which the effective sections of the electrode plates are 25 mm long, the positions of the effective sections are 375 mm below the solution surface, and the baffle plates are 150 mm long.

FIG. 9 is a schematic view showing a structure of an anodizing tank 20 used in this embodiment. In the anodizing tank 20, baffle plates 33 made of an insulator (e.g. a plate of glass fiber-reinforcing nylon resin of 2 mm thick) are disposed between the aluminum foil 21 and the electrode plates 23. The baffle plates 33 are separated by 1 cm from the effective sections 27 formed on the electrode plates 23 by coating insulators 32. In order to examine the influence of the baffle plates 33, the current density was measured by supplying a direct current between the etched aluminum foil 21 and the electrode plates 23.

Figure 10:
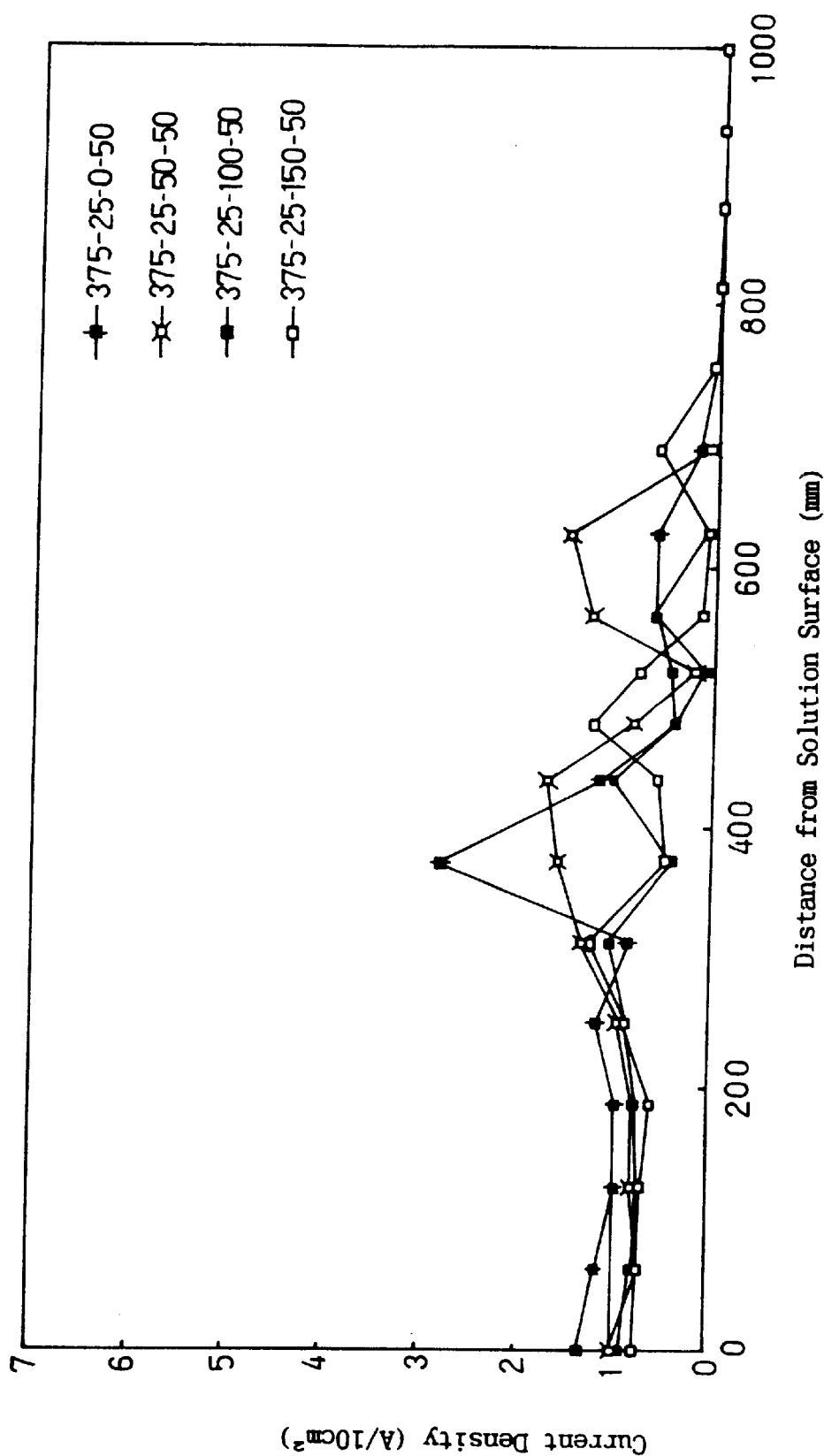
FIG. 10 is a graph showing the current density when anodizing was conducted using baffle plates of 0 mm long, 50 mm long, 100 mm long and 150 mm long respectively.
Figure 11:
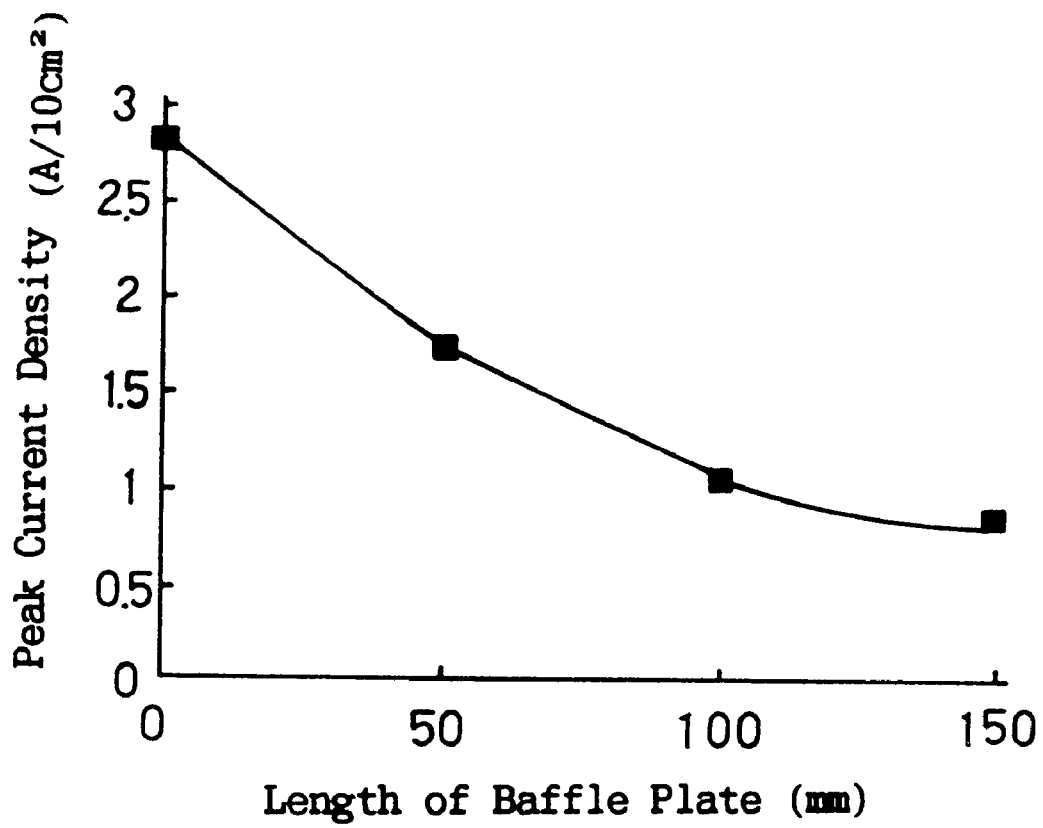
FIG. 11 is a graph showing the relationship between the length of the baffle plates and the peak current density.

In FIG. 9, the length 28 of the effective sections is 25 mm while the position 29 of the same sections is 375 mm below the solution surface. FIG. 10 is a graph showing the relationship between the current density and the distance from the solution surface. Anodization was conducted, varying the length 34 of the baffle plates (0 mm, 50 mm, 100 mm, and 150 mm). FIG. 11 is a graph showing the relationship between the length 34 of the baffle plates and the peak current density. When the baffle plates 33 50 mm in length (the length is twice the length 28 of the effective sections of the electrode plates) were provided, the peak current density was reduced by half. When the length of the baffle plates was 100 mm or 150 mm, the peak current density was further reduced in proportion. The peak current density was reduced to about one-third by using insulating baffle plates of 150 mm long, in which the peak value of the anodizing current density appeared at both ends of the baffle plates 33, while the current density at the surface of the electrolytic solution did not change. If the length 34 of the insulating baffle plate was two-thirds or less of the length 28 of the effective sections of the electrode plates, the effect of the baffle plates 33 might be nearly lost. When the length 34 of the baffle plate was fifteen times or more of the length 28 of the effective sections of the electrode plates, little current flowed. When the baffle plates 33 were provided with at least one hole or at least one slit, a uniform current flowed through the hole or the slit. When the slit width was one-third or more of the length 28 of the effective sections of the electrode plates, the peak of the anodizing current density appeared at the slit. Therefore, it is preferable that plural narrow slits are formed on the baffle plates. If the slit is 1mm wide or less, current does not flow. Thus, holes or slits on the baffle plate 33 should be suitable for the conductivity of the electrolytic solution and the anodizing condition so that a desirable currents flow. The best current density can be obtained by using porous materials for the baffle plates 33, or by using plural baffle plates.

The Third Embodiment

Figure 12:
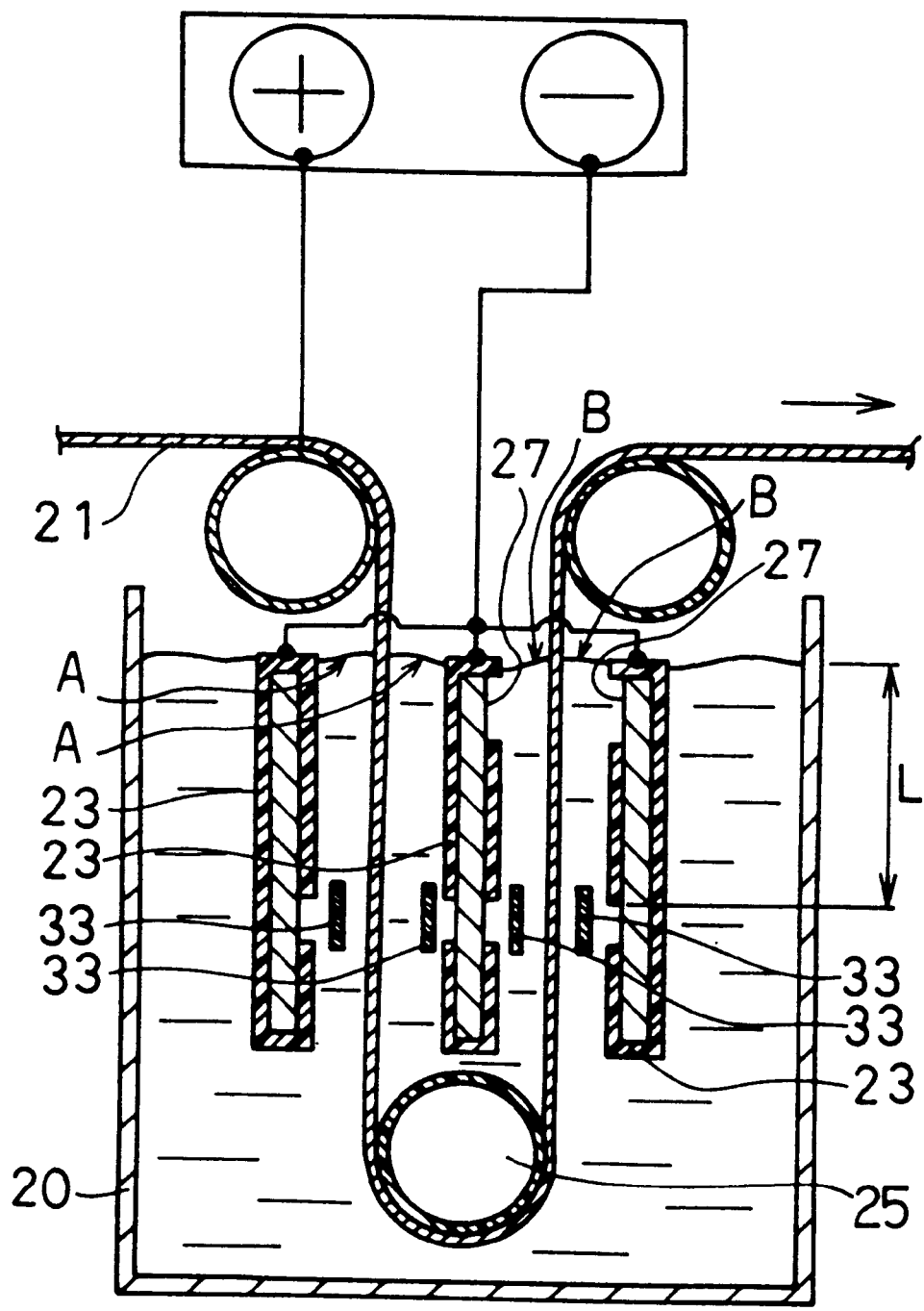
FIG. 12 is a schematic view showing an anodizing tank of one embodiment of this invention.
Figure 13:
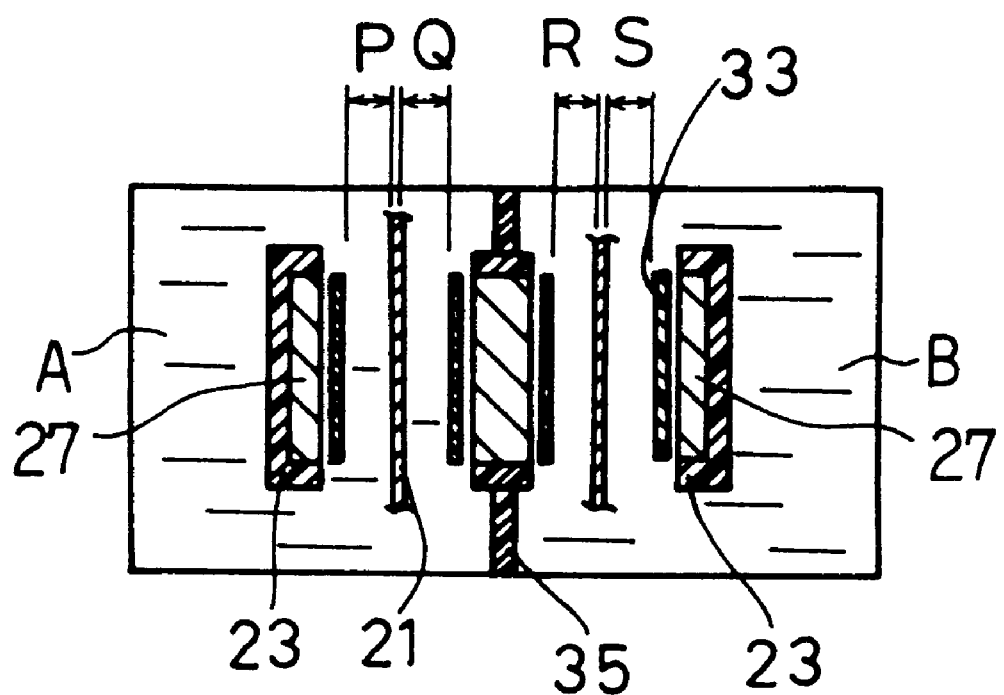
FIG. 13 is a schematic view showing the anodizing tank of FIG. 12 provided with insulating baffle plates between the aluminum foil and the electrode plates, and a current separating wall is further provided to separate the area A and the area B.

FIG. 12 is a schematic view showing the anodizing tank 20 provided with the insulating baffle plates 33 between the aluminum foil 21 and the electrode plates 23. In FIG. 13, the tank is divided by a current separating wall 35 so that a direct current flows only at the position where the aluminum foil 21 and the electrode plates 23 facing each other. Effective sections of the electrode plates are provided near the solution surface of the area B, and the current density was measured by supplying a direct current between the etched aluminum foil 21 (anode) and the electrode plates 23. In the drawing, distances P, Q, R, S can be regarded as substantially the same.

Figure 14:
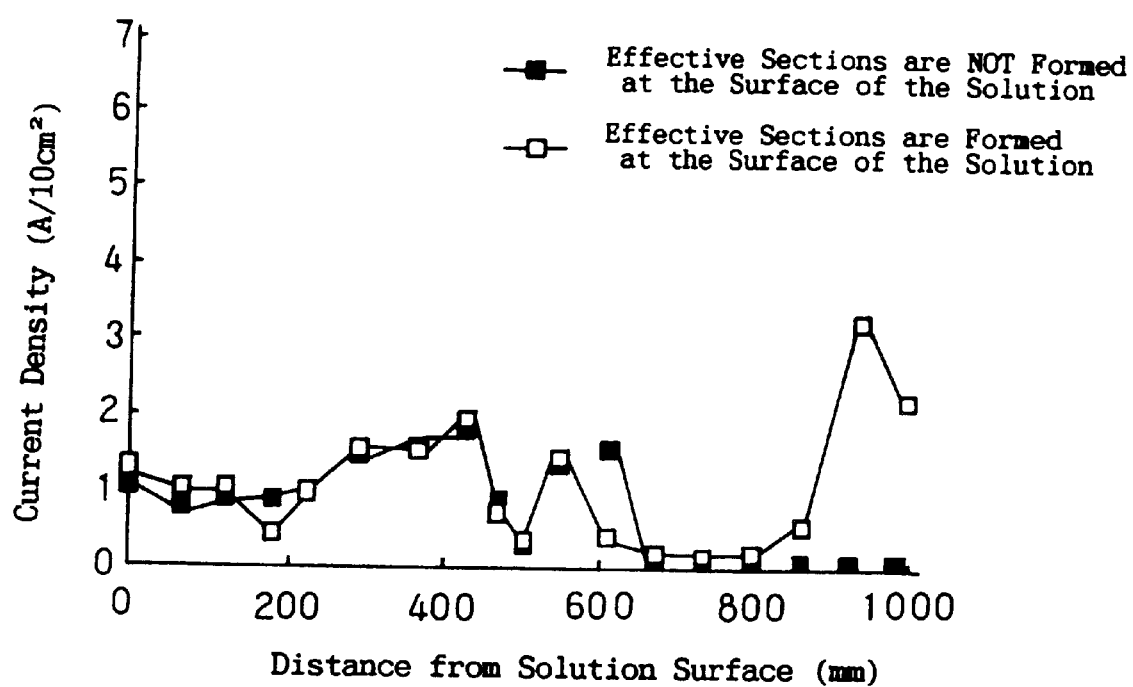
FIG. 14 is a graph showing the current density when anodizing was conducted using the electrode plates of FIG. 13.

In FIG. 13, the length 28 of the effective sections is 25 mm, the position 29 of the same sections is 375 mm below the solution surface, and the length 34 of the baffle plates is 50 mm. The current density was measured to examine the influence of the effective sections formed near the area B of the solution surface. FIG. 14 is a graph showing the relationship between the current density and the distance from the solution surface. The total current density in the area B is smaller compared to the other area when the effective sections 33 are not formed near the solution surface. And when effective sections 27 were formed near the solution surface of the area B, the current leaked from the lower part of the solution and concentrated near the solution surface of the area A. In FIG. 13, the two areas are separated by the current separating wall 35 provided on the electrode plate 23 above the bottom roller. Because of the current separating wall 35, the area A was not influenced by the effective sections 27 provided near the solution surface of the area B. Namely, the current separating wall 35 enabled controlling the current density of the area B without affecting the other area of the anodizing tank 20. As a result, the whole current of the anodizing tank 20 was able to be controlled by using the electrode plates. Even in this embodiment, some current leaked through the lower part of the solution, without reaching the aluminum foil 21 directly from the electrode plates 23. However, the value of the useless current was 10 mA/cm$^2$ at most.

The Fourth Embodiment

Figure 15:
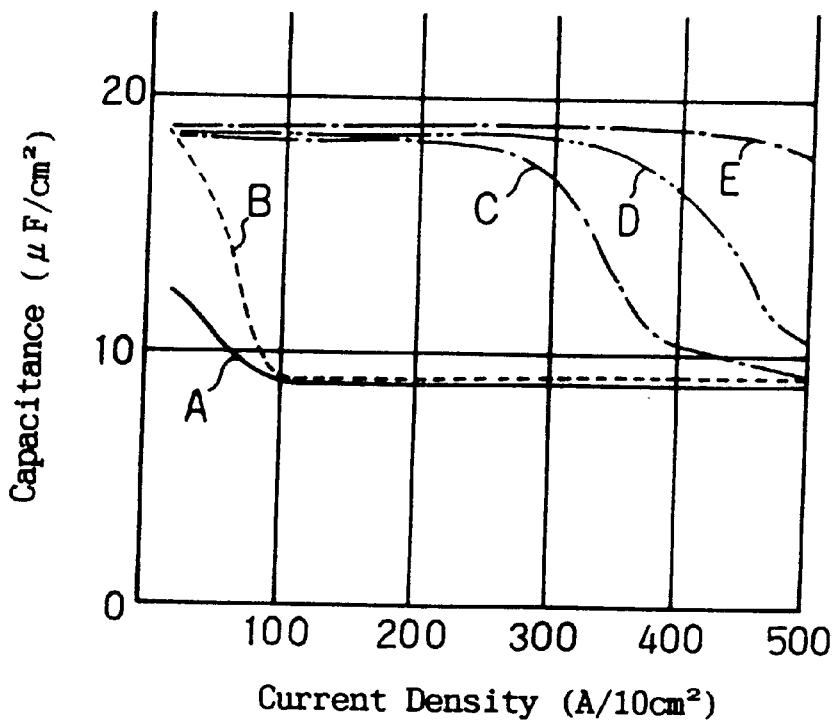
FIG. 15 is a graph showing the relationship between the current density and the conductivity of the electrolytic solution at anodization according to the method of producing an electrode foil for use in aluminum electrolytic capacitors of one embodiment of this invention.

The above-mentioned embodiments 1–3 will provide the best current density. Adjustment was carried out for some factors including the length 28 and the position 29 of the electrode sections, the length 34 of the insulating baffle plates, and the shape of the slits or of the holes formed on the baffle plates 33. Such adjustments are done depending on the irregularities on the aluminum foil 21, the conductivity of the electrolytic solution 24, the speed of the transporting of the aluminum foil, and so on. Or the current separating wall 35 was used to separate the two areas. Namely, the electrode foil for use in aluminum electrolytic capacitors was produced by applying voltage to the aluminum foil 21 in an electrolytic solution 24 and conducting continuous anodization. The electrolytic solution 24 is an aqueous solution containing at least one material selected from the group consisting of adipic acid, glutaric acid, sebacic acid, phosphoric acid, boric acid and ammonium salts thereof, and the conductivity of the solution is larger than $1 \times 10^{-3}$ S/cm and smaller than 0.55/cm at 90° C. FIG. 15 is a graph showing the relationship between the current density and the conductivity of the electrolytic solution 24 when the aluminum foil 21 having an irregular surface is anodized according to the method of producing an electrode foil for use in aluminum electrolytic capacitors of one embodiment of this invention. Line A indicates a case in which the conductivity of the electrolytic solution 24 is $2 \times 10^{-2}$ S/cm (90° C.), line B the case of $3 \times 10^{-2}$ S/cm (90° C.), line C the case of 0.15/cm (90° C.), line D the case of 0.25/cm (90° C.), and line E the case of 0.55/cm (90° C.). As clearly shown in FIG. 15, the capacitance is not lowered even if the current density is increased, when the conductivity of the electrolytic solution 24 is larger. When the value is at least 0.55/cm (90° C.), the solution resistance is decreased, and the current density is hot effectively controlled by means like the length 28 of the effective section of the electrode plates. If the value is less than $1 \times 10^{-3}$ S/cm (90° C.), the solution resistance is increased. And therefore, the current concentration does not cause serious problems even if the current density is not controlled by means like the length of effective section of the electrode plate.

Figure 16:
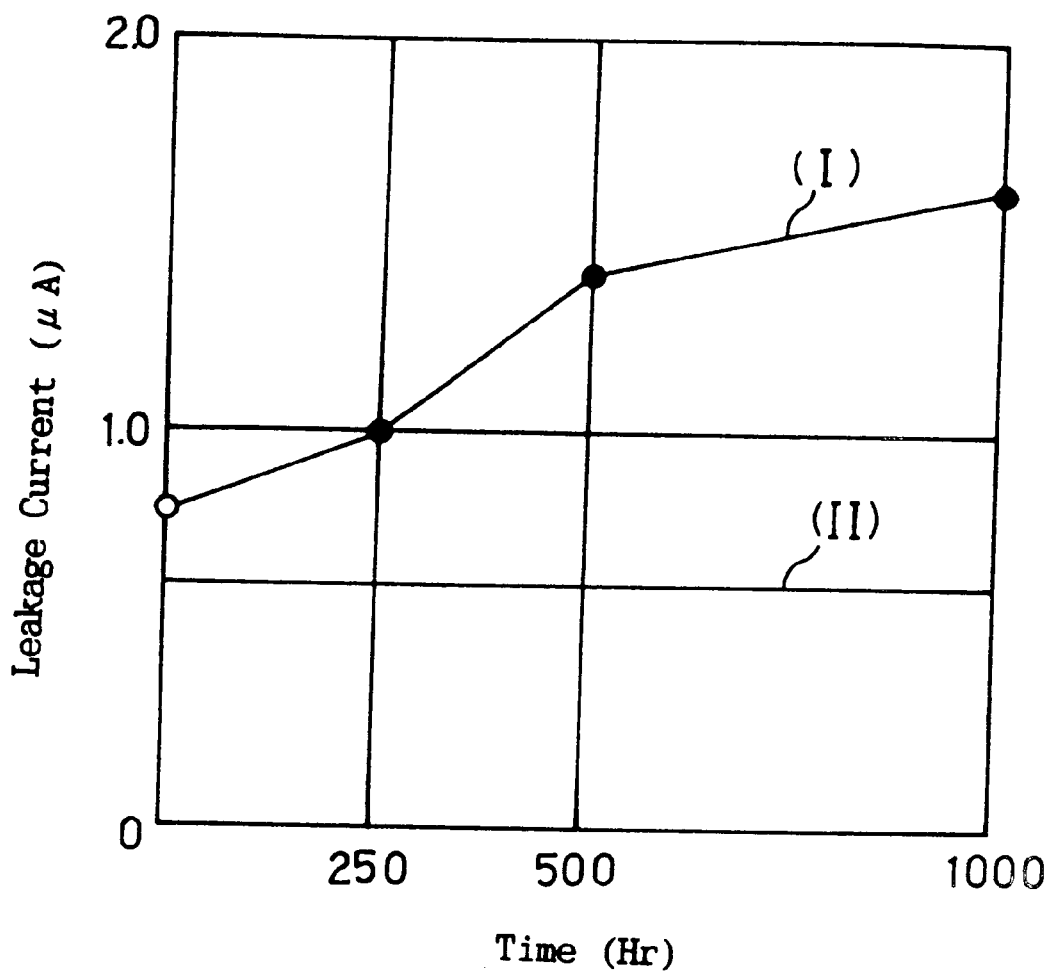
FIG. 16 is a graph showing the comparison of the leakage current of the aluminum electrolytic capacitors of one embodiment of this invention, and that of a conventional technique.

As mentioned above, a capacitance (24 $\mu$F/cm$^2$) which is higher than a conventional capacitance (22 $\mu$F/cm$^2$) can be obtained by setting the current density suitable for the conductivity of the electrolytic solution 24. Similar phonomena can be seen in the anodizing for a middle and a high voltage, though the quantity of aluminum hydroxide is less generated compared to the case of the low voltage, since hydration has been conducted in both cases. In the middle and high voltage anodizing, the peak current density can be lowered to $2\times10^2$ mA/cm$^2$ or less by dispersing the current density which is concentrated at the area A (FIG. 1). As a result, a higher capacitance of 0.65 $\mu$F/cm$^2$ can be obtained, while the conventional capacitance is 0.6 $\mu$F/cm$^2$. FIG. 16 is a graph showing the comparison of leakage currents of one embodiment of this invention and that of the conventional technique, in which a direct current is applied to aluminum electrolytic capacitors for 50 V. The line (I) indicates the leakage current of the aluminum elecrolytic capacitors produced according to the conventional anodizing method, and (II) indicates the leakage current of the aluminum elecrolytic capacitors produced according to an anodizing method of this invention. As clearly shown in this graph, the electrode foil produced by the anodizing method of this invention can decrease the leakage current. Regarding the leakage current, the surface of the aluminum foil 21 can be irregular or smooth before the anodizing process for producing an electrode foil.

In this embodiment, every one-pitch tank has one effective section of electrode plate while the aluminum foil 21 is anodized. It is also possible that a plurality of windows are provided. In other words, plural horizontal slits (windows) can be provided. It is preferable that the slits are at least 10 mm wide. In a case of a tank with more than one pitch, the windows can be provided to any tanks. Pitch means the frequency that an aluminum foil is vertically transported in a tank. FIG. 1 shows an example of a one-pitch tank. Though charging is conducted by the feeding roller 22 in this embodiment, it is also possible to conduct charging for the aluminum foil in the feeding tank 50, without using the charging roller 22. In this embodiment, the feeding tank 50 can also control the current density for the aluminum foil.

Figure 17:
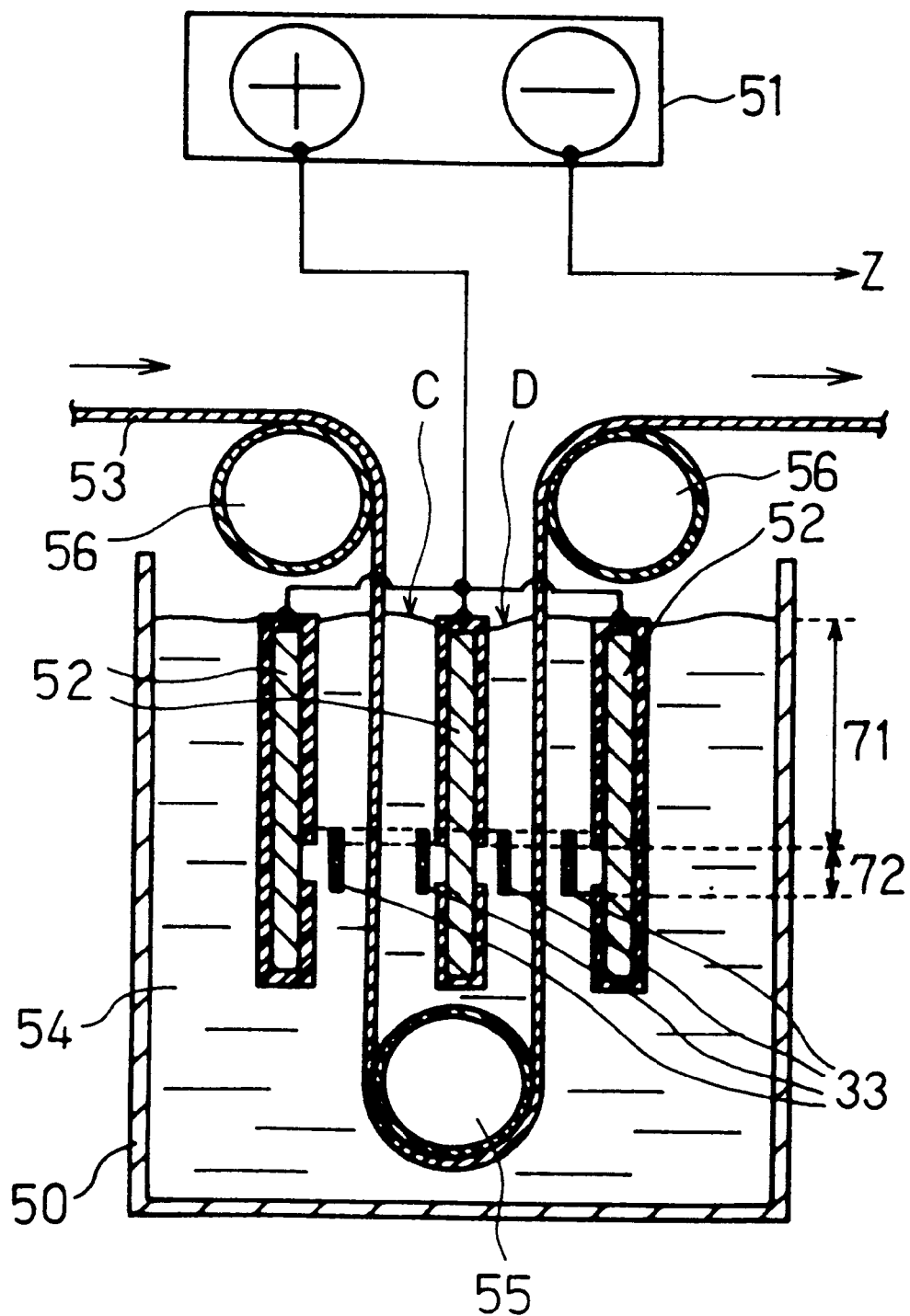
FIG. 17 is a schematic view showing a feeding tank of one embodiment of this invention.
Figure 18:
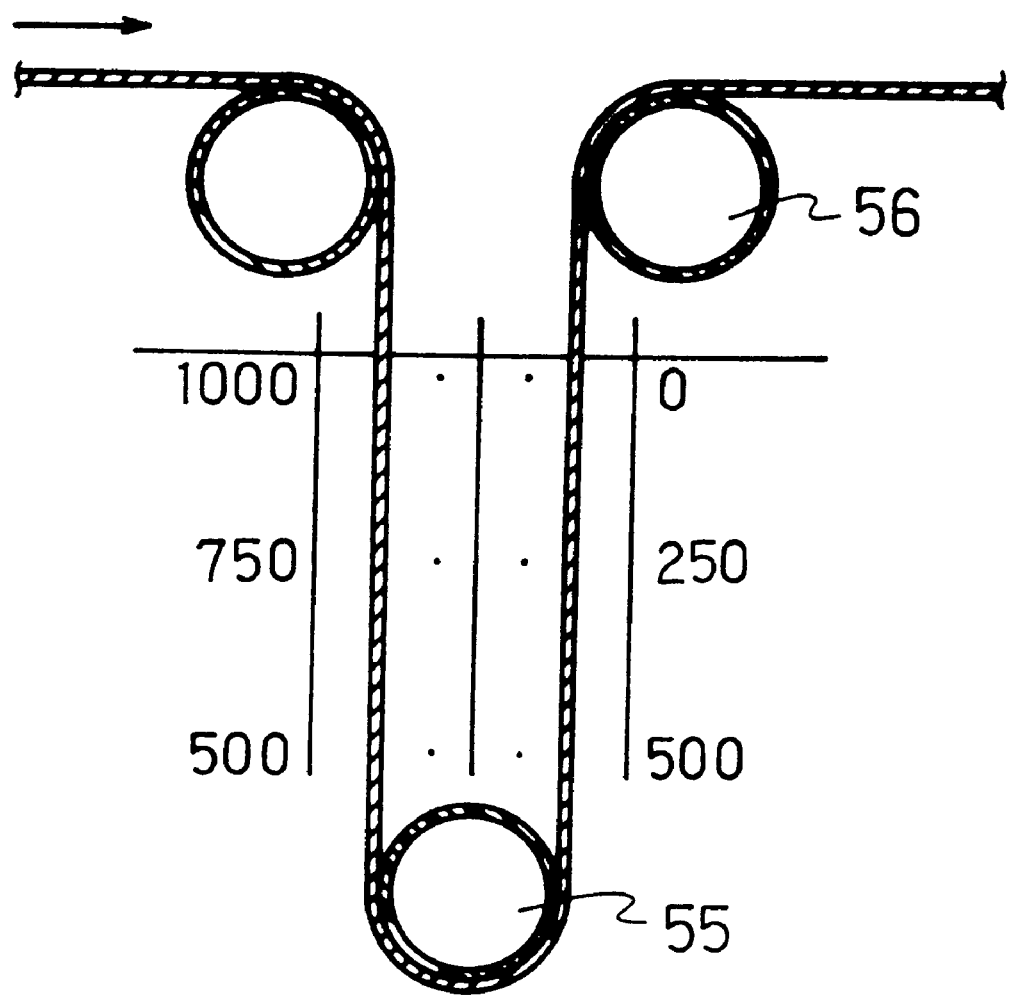
FIG. 18 is a schematic view showing the positions to measure the current density of the aluminum foil in the feeding tank in FIG. 17.
Figure 19:
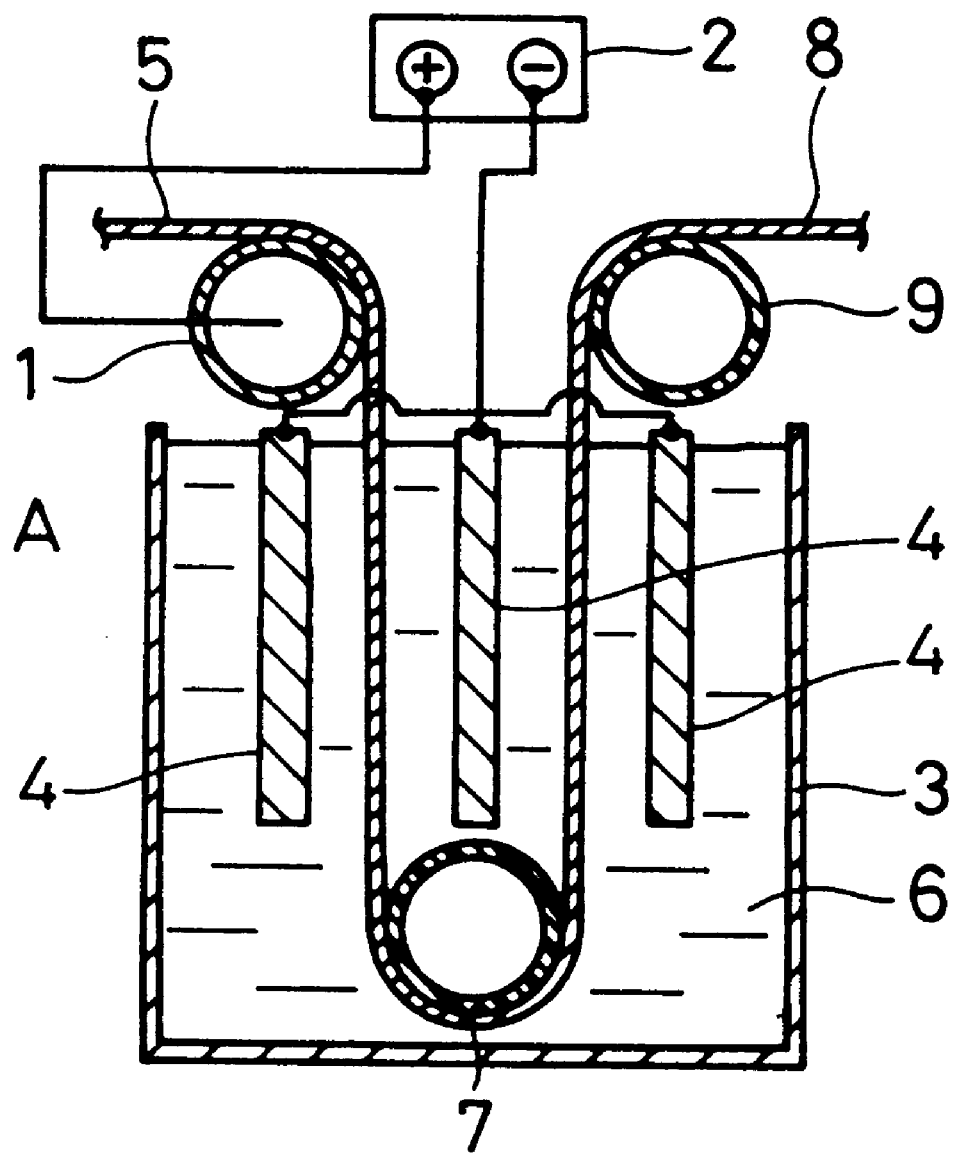
FIG. 19 is a schematic view showing a conventional anodizing tank.
Figure 20:
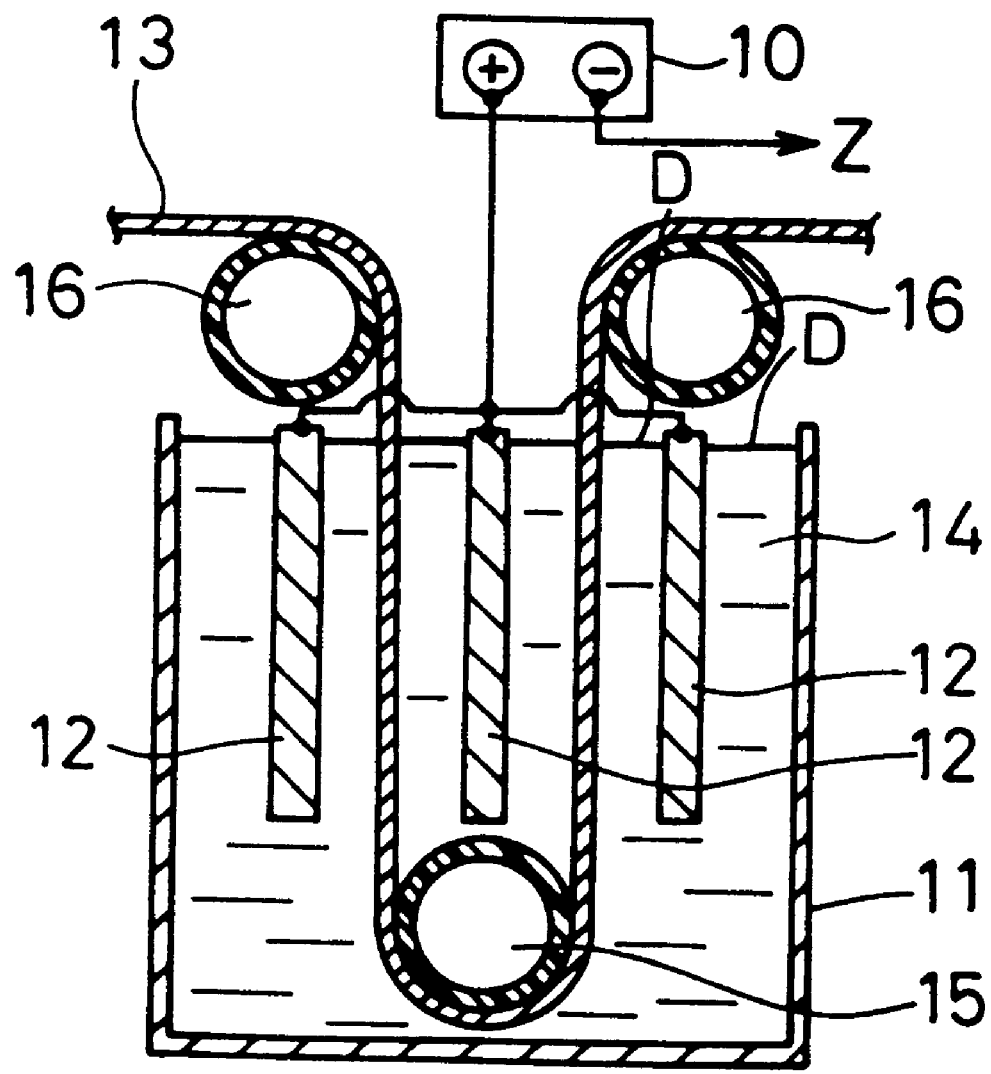
FIG. 20 is a schematic view showing a conventional feeding tank.

FIG. 17 shows the structure of a feeding tank. Numeral 50 is the feeding tank. 51 is a direct current power source. 52 are electrode plates. 53 is an aluminum foil. 54 is an electrolytic solution. 55 is a bottom roller and 56 is a transporting roller. The anode of the direct current power source 51 is connected to the electrode plates 52 in the feeding tank 50, and the cathode of the power source 51 is connected to the electrode plates 23 in the anodizing tank 20 of FIG. 1. The current from the direct current power source 51 is fed to the aluminum foil 53 via the electrode plates 52 and via the feeding solution 54. The current density was measured using the feeding tank 50 in FIG. 17 to examine the influence of the position and the length of the effective sections and of the baffle plates 33. A direct current was supplied between the aluminum foil 53 and the electrode plates 52, through the area D to the bottom roller 55, and the current passed the area C of the feeding solution 54 (FIG. 18). Though the current direction is the reverse of that of the anodizing tank 20, the relationship between the "distance from the solution surface" and the current density was the same as the tank 20. It is clear from FIG. 18 that a preferable feeding can be conducted if there is an exposed portion in the range of 200 to 500 mm below from the solution surface. A similar result is obtained if the means of anodizing is used for the feeding tank 50. Furthermore, the current density of the tank 50 can be controlled by the solution resistance.

It is clear from the above explanation that the apparatus for producing an electrode foil for use in aluminum electrolytic capacitors has a structure to conduct continuous anodization by (i) disposing at least two electrode plates as cathodes in an electrolytic tank containing an electrolytic solution, (ii) supplying a direct current between the aluminum foil as anode and the cathode electrode plate, (iii) turning the direction of the aluminum foil by plural rollers and conveying it between the electrode plates. And the length and the position of the effective portions of the electrode plates can be adjusted so that the peak value of the anodizing current density appears in the electrolytic solution, not at the surface of the solution. Accordingly, a large rush current does not flow substantially, and as a result, the fine irregularities on the aluminum foil do not melt, and substantially no aluminum hydroxide is formed. Therefore, a high capacitance is obtained and also, an electrode foil for use in aluminum electrolytic capacitors with reduced leakage current can be obtained.

As mentioned above, this invention provides an apparatus for producing an electrode foil for use in aluminum electrolytic capacitors to conduct a continuous anodization of the aluminum foil by supplying a direct current between an aluminum foil (anode) and electrode plates (cathodes) in an electrolytic tank containing electrolytic solution. According to this invention, the peak value of the anodizing current density appears not at the surface of the electrolytic solution but in the solution. Therefore, a high capacitance can be obtained and an electrode foil with reduced leakage current can be produced.

And according to the method of producing an electrode foil for use in aluminum electrolytic capacitors of this invention, an electrode foil for use in aluminum electrolytic capacitors can be produced efficiently.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. An apparatus for producing an electrode foil for use in aluminum electrolytic capacitors, comprising:

an electrolytic tank containing an electrolytic solution;

means for transporting a continuous strip of aluminum foil into the electrolytic tank from above, and for transporting the aluminum foil in the electrolytic solution in a direction transverse to a surface of the electrolytic solution;

an electrode plate vertically disposed in the electrolytic tank, the electrode plate in the electrolytic solution being coated with an insulator and a window being formed in the insulator on the electrode plate to expose the electrode plate facing the aluminum foil in a direction transverse to a longitudinal direction of the electrode plate to allow a supply of direct current between the aluminum foil and the electrode plate, wherein a top of said window is deeper than 125 mm from the surface of the electrolytic solution;

means for supplying a direct current between the aluminum foil as an anode and the electrode plate as a cathode to anodize the aluminum foil, and optionally, additional means for maintaining the peak value of anodizing current density at a location in the electrolytic solution not at the surface of the electrolytic solution.

2. The apparatus for producing an electrode foil for use in aluminum electrolytic capacitors according to claim 1, wherein the electrode plate is positioned to extend from above to below the surface of the electrolytic solution.

3. The apparatus for producing an electrode foil for use in aluminum electrolytic capacitors according to claim 1, further comprising an insulating baffle plate disposed between the electrode plate and the aluminum foil to keep the peak value of the anodizing current density in the electrolytic solution.

4. The apparatus for producing an electrode foil for use in aluminum electrolytic capacitors according to claim 1, wherein at least either opening area or opening position of the window is adjustable.

5. The apparatus for producing an electrode foil for use in aluminum electrolytic capacitors according to claim 4, wherein the apparatus comprises a bottom roller for turning the foil and the vertical dimension of the window is at most two-thirds of the distance from the electrolytic solution surface to the upper part of the bottom roller.

6. The apparatus for producing an electrode foil for use in aluminum electrolytic capacitors according to claim 1, which has at least two electrode plates as cathode in the electrolytic tank and plural rollers to transport the aluminum foil in order to continuously anodize the aluminum foil by turning the direction and transporting the foil between the electrode plates, one of the rollers being a bottom roller.

7. The apparatus for producing an electrode foil for use in aluminum electrolytic capacitors according to claim 6, wherein the bottom roller is formed of an insulating material.

8. The apparatus according to claim 6, in which the electrode plates are positioned so that the aluminum foil is anodized on both sides when transported between said electrode plates.

9. The apparatus for producing an electrode foil for use in aluminum electrolytic capacitors according to claim 1, wherein the insulator is at least one material selected from the group consisting of a synthetic resin and a synthetic rubber.

10. The apparatus for producing an electrode foil for use in aluminum electrolytic capacitors according to claim 1, wherein the conductivity E of the electrolytic solution is in the range of $1 \times 10^{-3} S/cm < E < 0.5 S/cm$ (90° C.).

11. An apparatus for producing an electrode foil for use in aluminum electrolytic capacitors, comprising:

at least two electrode plates vertically disposed as anodes in a feeding tank containing a feeding solution;

at least two electrode plates disposed as cathodes in an anodizing tank containing an anodizing solution;

means for transporting a continuous strip of aluminum foil into the feeding tank from above, and for transporting the aluminum foil in the feeding solution in a direction transverse to a surface of the feeding solution;

means for supplying a direct current between the anodes and the cathodes;

plural rollers for turning the direction of the aluminum foil and conveying the foil between the electrode plates in the feeding tank and from said feeding tank to said anodizing tank, wherein at least one of the electrode plates in the feeding solution is coated with an insulator and a window is formed in the insulator to expose the electrode plate facing the aluminum foil in a direction transverse to a longitudinal direction of the electrode plate, and wherein a top of said window is deeper than 125 mm from the surface of the feeding solution, and optionally, additional means to keep the peak value of the feeding current density in the feeding solution, not at the surface of the feeding solution.

12. The apparatus for producing an electrode foil for use in aluminum electrolytic capacitors according to claim 11, wherein the electrode plate is positioned to extend from above to below the surface of the feeding solution.

13. The apparatus for producing an electrode foil for use in aluminum electrolytic capacitors according to claim 11, further comprising an insulating baffle plate between an anode electrode plate and the aluminum foil in the feeding solution to keep the peak value of the charging current density in the feeding solution.

14. The apparatus for producing an electrode foil for use in aluminum electrolytic capacitors according to claim 11, wherein at least either opening area or opening position of the window is adjustable.

15. The apparatus for producing an electrode foil for use in aluminum electrolytic capacitors according to claim 14, wherein the foil is carried over a bottom roller in the feeding solution and the vertical dimension of the window is at most two-thirds of the distance from the feeding solution surface to the upper part of the bottom roller.

16. The apparatus for producing an electrode foil for use in aluminum electrolytic capacitors according to claim 11, wherein the foil is transported between the electrode plates in the anodizing tank.

17. The apparatus for producing an electrode foil for use in aluminum electrolytic capacitors according to claim 11, wherein at least one roller is an insulated roller.

18. The apparatus for producing an electrode foil for use in aluminum electrolytic capacitors according to claim 11, wherein the insulator is at least one material selected from the group consisting of a synthetic resin and a synthetic rubber.

19. The apparatus for producing an electrode foil for use in aluminum electrolytic capacitors according to claim 11, wherein the conductivity E of the feeding solution is in the range of $1 \times 10^{-3} S/cm < E < 0.5 S/cm$ (90° C.).

20. The apparatus according to claim 11, in which the foil is transported between the cathodes and the cathodes are positioned so that current flows on both sides of the aluminum foil.

21. An apparatus for producing an electrode foil for use in aluminum electrolytic capacitors, comprising:

an electrolytic tank containing an electrolytic solution;

means for transporting a continuous strip of aluminum foil into the electrolytic tank from above, and for transporting the aluminum foil in the electrolytic solution in a direction transverse to a surface of the electrolytic solution;

an electrode plate vertically disposed in the electrolytic tank, the electrode plate in the electrolytic solution being coated with an insulator and a window being formed in the insulator on the electrode plate to expose the electrode plate facing the aluminum foil in a direction transverse to a longitudinal direction of the electrode plate to allow a supply of direct current between the aluminum foil and the electrode plate;

a baffle plate between the aluminum foil and the electrode plate adjacent the window;

wherein a top of said window is deeper than 125 mm from the surface of the electrolytic solution;

means for supplying a direct current between the aluminum foil as an anode and the electrode plate as a cathode to anodize the aluminum foil, and optionally, additional means for maintaining the peak value of anodizing current density at a location in the electrolytic solution not at the surface of the electrolytic solution.

22. The apparatus according to claim 21, wherein the baffle plate comprises at least one opening.

23. The apparatus according to claim 21, wherein the baffle plate comprises a porous material.

24. An apparatus for producing an electrode foil for use in aluminum electrolytic capacitors, comprising:
- at least two electrode plates disposed as anodes in a feeding tank containing a feeding solution;
- at least two electrode plates disposed as cathodes in an anodizing tank containing an anodizing solution;
- means for transporting a continuous strip of aluminum foil into the feeding tank from above, and for transporting the aluminum foil in the feeding solution in a direction transverse to a surface of the feeding solution;
- means for supplying a direct current between the anodes and the cathodes;
- plural rollers for turning the direction of the aluminum foil and conveying the foil between the electrode plates in the feeding tank and from said feeding tank to said anodizing tank, wherein at least one of the electrode plates in the feeding solution is coated with an insulator and a window is formed in the insulator to expose the electrode plate facing the aluminum foil in a direction transverse to a longitudinal direction of the electrode plate;
- a baffle plate between the aluminum foil and the electrode plate adjacent the window and
- optionally, additional means to keep the peak value of the feeding current density in the feeding solution, not at the surface of the feeding solution.

25. The apparatus according to claim 24, wherein the baffle plate comprises at least one opening.

26. The apparatus according to claim 24, wherein the baffle plate comprises a porous material.

* * * * *